US011955752B2

(12) United States Patent
He et al.

(10) Patent No.: US 11,955,752 B2
(45) Date of Patent: Apr. 9, 2024

(54) ELECTRICAL CONNECTOR

(71) Applicant: LOTES CO., LTD, Keelung (TW)

(72) Inventors: Zhi Li He, Keelung (TW); Wen Chang Chang, Keelung (TW); Jie Liao, Keelung (TW); Jin Zhu Wang, Keelung (TW)

(73) Assignee: LOTES CO., LTD, Keelung (TW)

( * ) Notice: Subject to any disclaimer, the term of this patent is extended or adjusted under 35 U.S.C. 154(b) by 340 days.

(21) Appl. No.: 17/583,383

(22) Filed: Jan. 25, 2022

(65) Prior Publication Data

US 2022/0247131 A1 Aug. 4, 2022

(30) Foreign Application Priority Data

Feb. 2, 2021 (CN) ......................... 202110145491.9
Jun. 24, 2021 (CN) ......................... 202110702668.0
Nov. 8, 2021 (CN) ......................... 202111313724.8

(51) Int. Cl.
*H01R 13/6586* (2011.01)
*H01R 13/514* (2006.01)

(52) U.S. Cl.
CPC ....... *H01R 13/6586* (2013.01); *H01R 13/514* (2013.01)

(58) Field of Classification Search
CPC .... H01R 13/46; H01R 13/502; H01R 13/506; H01R 13/514; H01R 13/658; H01R 13/6581; H01R 13/6582; H01R 13/6585; H01R 13/6586
USPC ..................................................... 439/607.08
See application file for complete search history.

(56) References Cited

U.S. PATENT DOCUMENTS 7,789,676 B2 9/2010 Morgan et al.
8,641,448 B2 2/2014 Lappoehn

FOREIGN PATENT DOCUMENTS

CN 103296510 B 11/2015
CN 104737374 B 8/2017
CN 105470732 B 10/2019
CN 110323632 A 10/2019
CN 106104933 B 9/2020
CN 212257798 U 12/2020
CN 213753308 U 7/2021

*Primary Examiner* — Khiem M Nguyen
(74) *Attorney, Agent, or Firm* — Locke Lord LLP; Tim Tingkang Xia, Esq.

(57) ABSTRACT

An electrical connector includes at least one electrical module. The electrical module includes: an insulating body, where multiple first accommodating slots are concavely provided on a first side toward a second side of the insulating body; multiple first terminal assemblies, respectively accommodated in the corresponding first accommodating slots; and a first grounding member, having multiple first spokes and multiple second spokes. Each first terminal assembly includes a first insulating block, a pair of first signal terminals, and a first shielding shell. Each first shielding shell has a first shielding side surface exposed to the first side. Each first spoke is in mechanical contact with the first shielding shells of a same electrical module, and each second spoke is in contact with the first shielding side surface of the corresponding first shielding shell, thus achieving conduction between the first shielding shells and the first grounding member.

21 Claims, 27 Drawing Sheets

ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN202110145491.9 filed in China on Feb. 2, 2021, patent application Serial No. CN202110702668.0 filed in China on Jun. 24, 2021, and patent application Serial No. CN202111313724.8 filed in China on Nov. 8, 2021. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector with high frequency characteristics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional backplate electrical connector, such as Chinese Patent No. CN201580014851.4, may be referred to as FIG. 4A to FIG. 8B of the Patent. The electrical connector includes a plurality of modules 910 assembled in a two-dimensional array. Each module 910 includes a pair of conductive components 925 and 935 being configured to support differential signals, a shell 918 fixed the pair of conductive components 925 and 935, and a shielding structure member 916 surrounding the conductive components 925 and 935. The modules 910 are assembled together through protruding portions 912 and concave portions 914 of the shielding structure member 916.

However, in the electrical connector, the modules 910 are assembled together merely through the protruding portions 912 and the concave portions 914 of the shielding structure member 916, and the modules 910 may easily detach from one another, resulting in the structure of the electrical connector being unstable. Further, the shielding structure members 916 of the three modules 910 on the same thin sheet 754A-754D are in contact through the protruding portions 912, and the contact between the shielding structure members 916 may be easily affected due to the existence of tolerances of the matching sizes of the protruding portions 912 and the concave portions 914, thus resulting in ill contact, and affecting the conductive connection between the shielding structure members 916. Moreover, except for the protruding portions 912 and the concave portions 914, assembling gaps may exist between the remaining portions of the shielding structure members 916, such that the conductive components 925 and 935 of the modules 910 may generate signal crosstalk, thereby affecting the high frequency characteristics of the electrical connector.

Therefore, a heretofore unaddressed need to design a new electrical connector exists in the art to address the aforementioned deficiencies and inadequacies.

SUMMARY

In view of the deficiency of the background, the present invention is directed to an electrical connector, which achieves the conductive connection between the shielding shells and the shielding members by conducting the shielding shells located in a same electrical module through a first spoke of each shielding member, and by contacting the plate surface of each second spoke of each shielding member with the corresponding first shielding side surface, thus enhancing the high frequency characteristics thereof.

To achieve the foregoing objective, the present invention adopts the following technical solutions. An electrical connector includes at least one electrical module. The electrical module includes: an insulating body, having a first side and a second side opposite to each other in a first direction, wherein a plurality of first accommodating slots are concavely provided on the first side of the insulating body toward the second side and are arranged along a second direction perpendicular to the first direction; a plurality of first terminal assemblies, respectively accommodated in corresponding ones of the first accommodating slots, and formed by a plurality of first insulating blocks, a plurality of first signal terminals and a plurality of first shielding shells, wherein each of the first terminal assemblies comprises a corresponding first insulating block of the first insulating blocks, a corresponding pair of first signal terminals of the first signal terminals fixed to the corresponding first insulating block, and a corresponding first shielding shell of the first shielding shells covering the corresponding first insulating block and the corresponding pair of first signal terminals, and wherein each of the first shielding shells has a first shielding side surface exposed to the first side; and a first grounding member, in mechanical contact with and fixed to the first shielding shells of the first terminal assemblies, and shielding an outer side of the first shielding side surface of each of the first shielding shells and adjacent to the first side, wherein the first grounding member has a plurality of first spokes and a plurality of second spokes, each of the first spokes corresponds to the first shielding shells of a same one of the at least one electrical module, the second spokes one-to-one correspond to the first shielding shells, a side edge of each of the second spokes and at least one of the first spokes are cross-connected, and a plate surface of each of the second spokes extends along the first shielding side surface of a corresponding first shielding shell of the first shielding shells and is in contact with the first shielding side surface of the corresponding first shielding shell.

In certain embodiments, the insulating body has a plurality of first partition portions, the first partition portions and the first accommodating slots are alternately provided on the insulating body along the second direction, one of the first partition portions is provided between each two adjacent ones of the first accommodating slots to separate two adjacent ones of the first shielding shells of the first terminal assemblies, one of each of the first shielding shells and a corresponding adjacent one of the first partition portions is protrudingly provided with at least one insertion portion, and the other of each of the first shielding shells and the corresponding adjacent one of the first partition portions is concavely provided with at least one first fixing slot to match and fix with the at least one insertion portion.

In certain embodiments, the first shielding side surface of each of the first shielding shells is provided with the at least one insertion portion along an extending direction of at least one of the first spokes, the corresponding adjacent one of the first partition portions is provided with the at least one first fixing slot, the insertion portions of the first shielding shells of the first terminal assemblies of the same one of the at least one electrical module are arranged along the extending direction of the at least one of the first spokes and are exposed to the first side of the insulating body, and a plate surface of at least one of the first spokes shields and is in contact with the corresponding insertion portions along the first direction.

In certain embodiments, the insulating body has a plurality of first partition portions, one of the first partition portions is provided between each two adjacent ones of the first accommodating slots, each of the first partition portions is respectively provided with a plurality of fixing recesses corresponding to the first spokes, each of the fixing recesses penetrates through a corresponding one of the first partition portions along an extending direction of a corresponding one of the first spokes, each of the first spokes is accommodated in the fixing recesses arranged in the extending direction thereof, and each of the second spokes is accommodated in a corresponding one of the first accommodating slots.

In certain embodiments, each of the first shielding shells has a second shielding side surface opposite to the first shielding side surface, the second shielding side surface of each of the first shielding shells is limited by a side wall surface of a corresponding one of the first accommodating slots along the first direction, a corresponding one of a plurality of protruding portions is protrudingly provided on a slot wall surface of each of the fixing recesses toward the first side of the insulating body, and each of the first spokes is provided with a plurality of through holes to respectively match and fix with the protruding portions.

In certain embodiments, each of the first shielding shells comprises a first shielding member and a second shielding member, a side surface of the first shielding member and a side surface of the second shielding member are fixed to each other by a plurality of fixing mechanisms, and the plate surface of each of the second spokes shields at least one of the fixing mechanisms in the first direction.

In certain embodiments, in the same one of the first terminal assemblies, the first shielding member and the second shielding member are two U-shaped structures provided opposite to each other, two opposite side surfaces of the first shielding member cover and are fixed to two opposite outer side surfaces of the second shielding member, each of the first signal terminals, the first shielding member and the second shielding member is provided with a bending section at a same location, an edge of the bending section of the first shielding member is concavely provided with a first notch, an edge of the bending section of the second shielding member is concavely provided with a second notch, the second notch is covered by the bending section of the first shielding member, and the first notch is located at an outer side of a side surface of the bending section of the second shielding member and is not communicated with the second notch.

In certain embodiments, the first shielding member has a plurality of pairs of contact protruding points, two contact protruding points of each pair of the pairs of contact protruding points are provided on the two opposite side surfaces of the first shielding member and are protruding toward each other, a distance between the two contact protruding points of each pair of the pairs of contact protruding points in the first direction is defined as a first distance, a distance between the two opposite outer side surfaces of the second shielding member in the first direction is defined as a second distance, when the first shielding member is not matched and fixed with the corresponding second shielding member, the first distance is less than the second distance; and when the first shielding member is fixed with the second shielding member, the two contact protruding points of each pair of the pairs contact protruding points are respectively in contact with the two opposite outer side surfaces of the second shielding member, and the first distance is equal to the second distance.

In certain embodiments, each pair of the first signal terminals is arranged in parallel along the first direction, each of the first signal terminals has a first contact portion, a first conductive portion and a first connecting portion located between the first contact portion and the first conductive portion, a third direction is defined to be perpendicular to the first direction and the second direction, the first contact portion extends from one end of the first connecting portion along the third direction and is configured to be in contact with a mating terminal of a mating connector in the second direction, each of the first shielding shells has a main body portion accommodated in a corresponding one of the first accommodating slots and an enlarged portion extending from one end of the main body portion along the third direction, the enlarged portion surrounds the first contact portions of the corresponding pair of first signal terminals, a distance between two shielding surfaces of the enlarged portion opposite to each other in the second direction is defined as a third distance, a distance between two shielding surfaces of the main body portion opposite to each other in the second direction is defined as a fourth distance, and the third distance is greater than the fourth distance.

In certain embodiments, each of the first signal terminals of each of the first terminal assemblies has a first contact portion, a first conductive portion and a first connecting portion located between the first contact portion and the first conductive portion, the first insulating block covers the first connecting portions of the corresponding pair of the first signal terminals, the first insulating block has a first insulating surface and a second insulating surface provided opposite to each other in the second direction, the first insulating surface of the first insulating block is concavely provided with an exposure slot toward the second insulating surface, the exposure slot extends along a length direction of the first connecting portion, a portion of the first connecting portion protrudes and enter the exposure slot along the first direction, another portion of the first connecting portion is embedded in the first insulating block, and for each of the first signal terminals, a width of the first connecting portion along the first direction is less than a width of the first contact portion along the first direction.

In certain embodiments, the electrical connector includes a plurality of electrical modules arranged in parallel along the first direction, wherein the two first signal terminals of each of the first terminal assemblies located in a same one of the electrical modules are arranged in parallel along the first direction, each of the first conductive portions of the two first signal terminals protrudes out of the first insulating block along the second direction to be soldered to a base plate, each pair of the first conductive portions is covered by the corresponding one of the first shielding shells, a third direction is defined to be perpendicular to the first direction and the second direction, the first conductive portions of the pairs of the first signal terminals located in the same one of the electrical modules are arranged along the third direction, and a thickness of the first conductive portion along the third direction is less than a thickness of the first connecting portion along the third direction.

In certain embodiments, each of the first shielding shells comprises a first shielding member and a second shielding member in contact with each other, the first shielding member is provided with a first main body portion and at least one first extending arm extending from the first main body portion, the first shielding side surface is provided on the second shielding member, and the first extending arm is fixed to the first shielding side surface; and the first grounding member is provided with at least one reserved area, the reserved area provides a reserved space for a corresponding one of the first extending arm, and a projection of the first grounding member along the second direction partially overlaps with a projection of the first extending arm located in the reserved area along the second direction.

In certain embodiments, the first shielding member has two first extending arms along a length direction of the first main body portion, the two first extending arms are respectively adjacent to two side edges of a corresponding one of the first spokes, and the two first extending arms are formed by extending from different edges of the first main body portion.

In certain embodiments, the first shielding member has a plurality of first extending arms, the first extending arms are formed by extending from different edges of the first main body portion, and the first extending arms are staggered along an extending length of the first main body portion.

In certain embodiments, the reserved area is a recess, at least one of the second spokes is provided with two adjacent recesses, the two recesses are located at two sides of a corresponding one of the first spokes, the first shielding member has two first extending arms correspondingly located at the two recesses, the two first extending arms located at the two recesses are limited by the corresponding one of the first spokes along an extending length of the second spokes, each of the first spokes is provided with a plurality of through holes arranged along an extending direction thereof, the insulating body is provided with a plurality of protruding portions, and each of the protruding portions is fixed in a corresponding one of the through holes.

In certain embodiments, the at least one first extending arm is provided to be adjacent to a corresponding one of the first spokes and is limited to a side edge of the corresponding one of the first spokes along an extending length of the second spokes.

In certain embodiments, the first terminal assemblies are arranged in a first row along the second direction, the electrical module further comprises a plurality of second terminal assemblies fixed to the insulating body, the second terminal assemblies are arranged in a second row along the second direction and parallel to the first row, each of the second terminal assemblies comprises a second insulating block, a pair of second signal terminals fixed to the second insulating block, and a second shielding shell covering the second insulating block and the pair of second signal terminals; and the second shielding shell comprises a third shielding member and a fourth shielding member, the third shielding member has a second main body portion and at least one second extending arm extending from the second main body portion, the fourth shielding member has an inner shielding surface and an outer shielding surface provided oppositely along a thickness direction thereof, the inner shielding surface and the second main body portion are altogether surroundingly provided to form a shielding space, the second insulating block and the two second signal terminals are located in the shielding space, the second extending arm is fixed to the outer shielding surface, the insulating body is provided with at least one concave area corresponding to the second extending arm, and the concave area is reserved for the corresponding second extending arm.

In certain embodiments, a plurality of second accommodating slots are concavely provided from the second side toward the first side and are arranged along the second direction, each of the second accommodating slots accommodates a corresponding one of the second terminal assemblies, the concave area is concavely formed on a wall of a corresponding one of the second accommodating slots, one of a plurality of first partition portions is provided between two adjacent ones of the first accommodating slots, and one of a plurality of second partition portions is provided between two adjacent ones of the second accommodating slots; and the first terminal assemblies and the second terminal assemblies deviate from each other along the second direction, and the first partition portions and the second partition portions are completely staggered along the second direction.

In certain embodiments, each of the first spokes has an extending section, the extending section extends beyond a side edge of a corresponding one of the second spokes to form a free end, the extending section is provided with a through hole, the insulating body is provided with a protruding portion, and the protruding portion is fixed in the through hole.

In certain embodiments, the electrical connector is configured to mate with a mating connector along a mating direction, the mating connector is provided with at least two mating terminals and an insulating covering body covering the two mating terminals, and the insulating covering body is provided with at least one supporting portion configured to support the mating terminals; and a portion of each of the first shielding shells is surroundingly provided around first contact portions of the corresponding pair of first signal terminals and is concavely provided with a reserved slot, a contact surface of each of the first contact portions faces toward the reserved slot, and the reserved slot is configured to reserve for the supporting portion.

In certain embodiments, the first grounding member is engaged in the insulating body from the first side toward second side, the first grounding member has a first plate surface in contact with a plurality of first shielding side surfaces of the same one of the electrical module and a second plate provided opposite to the first plate surface along a thickness direction thereof, and the second plate surface does not pass beyond the first side along a facing direction thereof.

Compared with the related art, the electrical connector according to certain embodiments of the present invention has the following beneficial effects. The first terminal assemblies are accommodated in the first accommodating slots of the insulating body, such that the insulating body and the first terminal assemblies may be conveniently assembled and detached, thereby allowing assembling or repairing and replacing any damaged first terminal assemblies. The first shielding shell of each first terminal assembly covers a corresponding pair of the first signal terminals, thus reducing the signal crosstalk between two adjacent pairs of the first signal terminals. The first grounding member allows the first shielding shells of the same electrical module to be conductively connected by each first spoke, such that the first shielding shells of the same electrical module have the same electrical potential, thus improving the shielding effect of the first shielding shells of the same electrical module, and enhancing the high frequency characteristics of the electrical connector. The plate surface of each second spoke of the first grounding member extends along the first shielding side surface of the corresponding first shielding shell and is in contact with the corresponding first shielding side surface, thus increasing the contact area of the first shielding shells and the first grounding member, ensuring the electrical conductive connection between the first shielding shells and the first grounding member, and enhancing the high frequency characteristics of the electrical connector. Meanwhile, the second spokes may further stop the first shielding shells along the first direction, thus preventing the first shielding shells from excessive displacement along the first direction or even detaching from the first accommodating slots. Further, the first grounding member increases transmission paths for the grounding of the first shielding shells, allowing the noise signals to be conducted out of the electrical connector more quickly. Compared to the case where the first grounding member is only provided with a plurality of first spokes, in certain embodiments of the present invention, a side edge of each second spoke of the first grounding member and at least one of the first spokes are cross-connected, such that the structure of the first grounding member is stable, and the first spokes do not easily deform.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
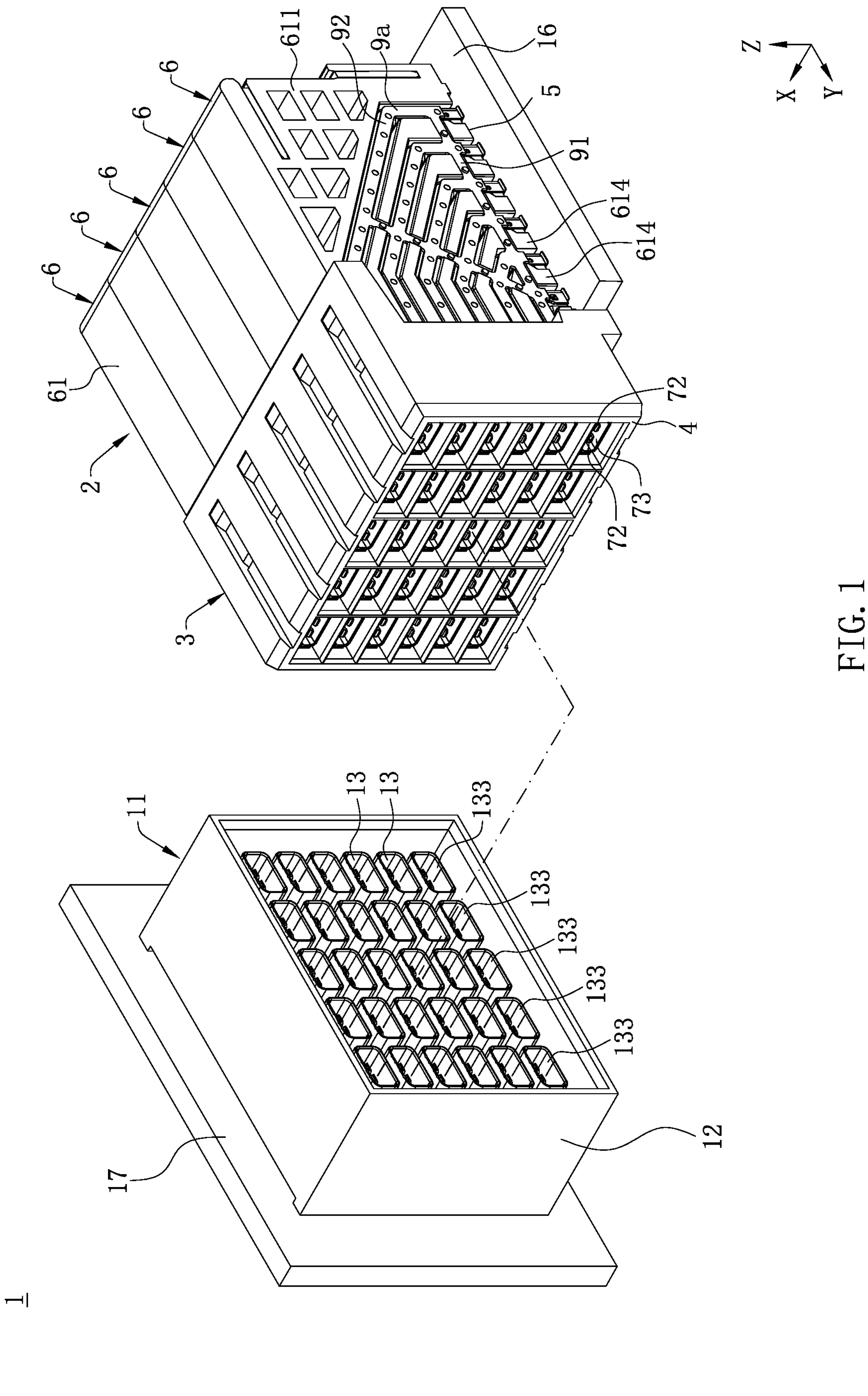
FIG. 1 is a perspective schematic view of an electrical connector and a mating connector of an electrical connector assembly prior to mating according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the"

includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-27. In accordance with the purposes of this invention, as embodied and broadly described herein, this invention, in one aspect, relates to an electrical connector.

FIG. 1 to FIG. 13 show a first embodiment of the present invention. For convenience of understanding, in the three-dimensional coordinate as shown in the accompanied drawings in the first embodiment, the X-axis is defined as a first direction, the Z-axis is defined as a second direction, and the Y-axis is defined as a third direction. Any two of the X-axis, the Y-axis and the Z-axis are perpendicular to each other.

FIG. 1 to FIG. 4 show an electrical connector assembly 1 according to the first embodiment of the present invention, which includes an electrical connector 2 and a mating connector 11 mated with the electrical connector 2. A matching end 4 of the electrical connector 2 is mated with one end of the mating connector 11 along the third direction Y. A mounting end 5 of the electrical connector 2 is connected to a first base plate 16 along the second direction Z. Another end of the mating connector 11 is electrically connected to a second base plate 17. In other embodiments, the mounting end of the electrical connector may be electrically connected to a cable or other electrical components. Similarly, the mating connector 11 may be connected to a cable or other electrical components without being connected to the second base plate 17.

FIG. 1 to FIG. 5 show the electrical connector 2 according to the first embodiment of the present invention. The electrical connector 2 includes a first insulating mating shell 3 mated with the mating connector 11 and a plurality of electrical modules 6. The electrical modules 6 are arranged sequentially in parallel along the first direction X, and the electrical modules 6 are connected to the first insulating mating shell 3 along the third direction Y. Each electrical module 6 includes a plurality of first terminal assemblies 7 arranged on an insulating body 61 along the second direction Z. The electrical modules 6 are further positioned through two retaining sheets 10.

Referring to FIG. 1 to FIG. 4 and FIG. 13, the mating connector 11 according to the first embodiment of the present invention includes a second insulating mating shell 12, a plurality of mating terminal assemblies 13 fixed to the second insulating mating shell 12, and a plurality of grounding bars 14. Each mating terminal assembly 13 includes an insulating covering body 131, two mating terminals 132 fixed to the insulating covering body 131, and a mating shielding shell 133 covering the insulating covering body 131 and the two mating terminals 132. Each mating terminal assembly 13 is mated with a corresponding first terminal assembly 7. Specifically, the mating shielding shell 133 of each mating terminal assembly 13 is mated with the first shielding shell 73 of the corresponding first terminal assembly 7, and the two mating terminals 132 of each mating terminal assembly 13 are mated with the pair of the first signal terminals 72 of the corresponding first terminal assembly 7. The mating terminal assemblies 13 are arranged in a plurality of columns, and the mating terminal assemblies 13 in each column are arranged along the first direction X. Each grounding bar 14 extends along the first direction X. The mating shielding shells 133 in each column are simultaneously in contact with a corresponding grounding bar 14, such that the mating shielding shells 133 in the same column have a same electrical potential, thus enhancing the high frequency characteristics of the mating connector 11. Each grounding bar 14 is provided with two interfering portions 141 protruding outward at two ends thereof in the first direction X, and each grounding bar 14 is fixed with interference to the second insulating mating shell 12 by the two interfering portions 141.

Figure 2:
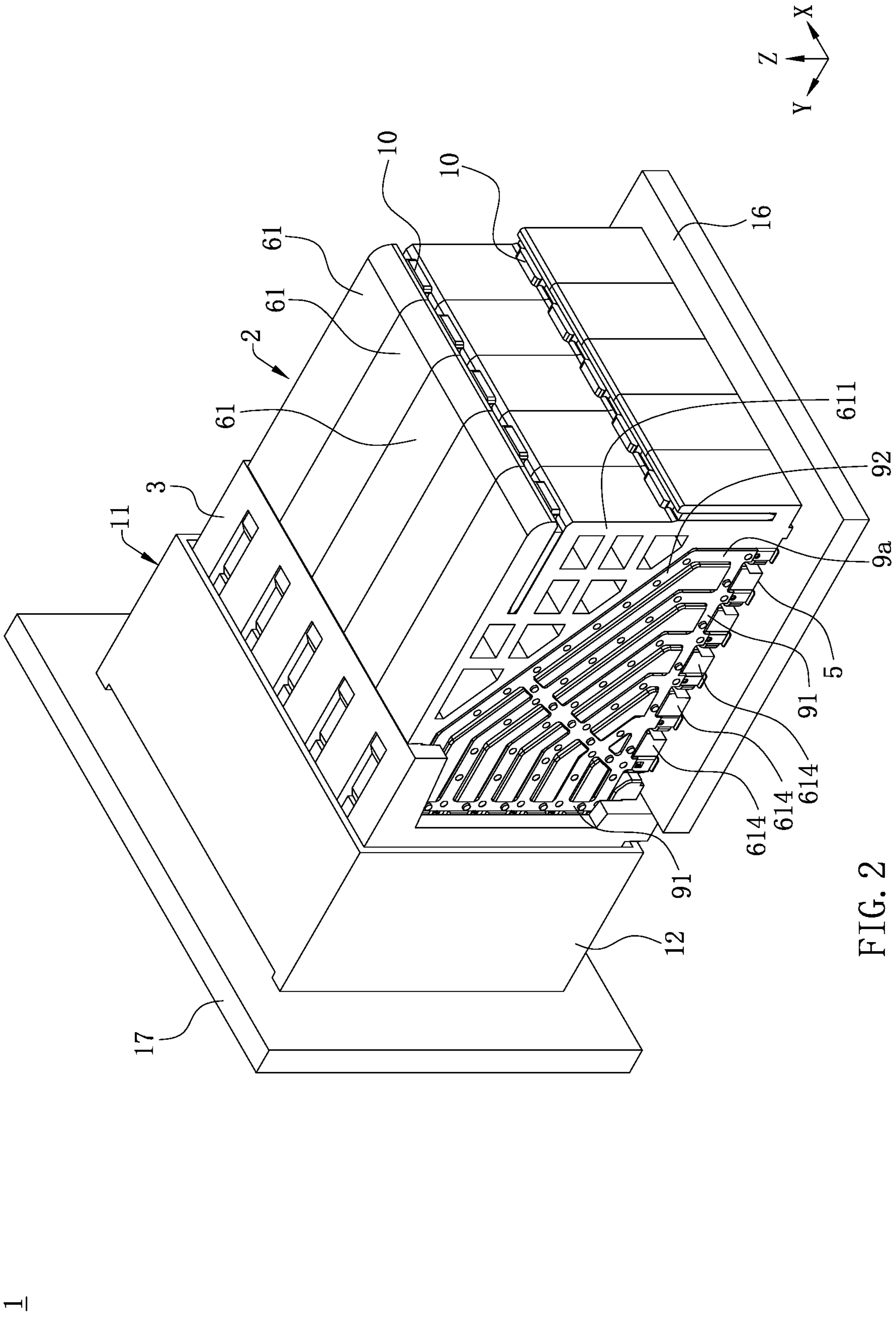
FIG. 2 is a perspective schematic view of the electrical connector and the mating connector of the electrical connector assembly after completion of mating according to the first embodiment of the present invention.
Figure 3:
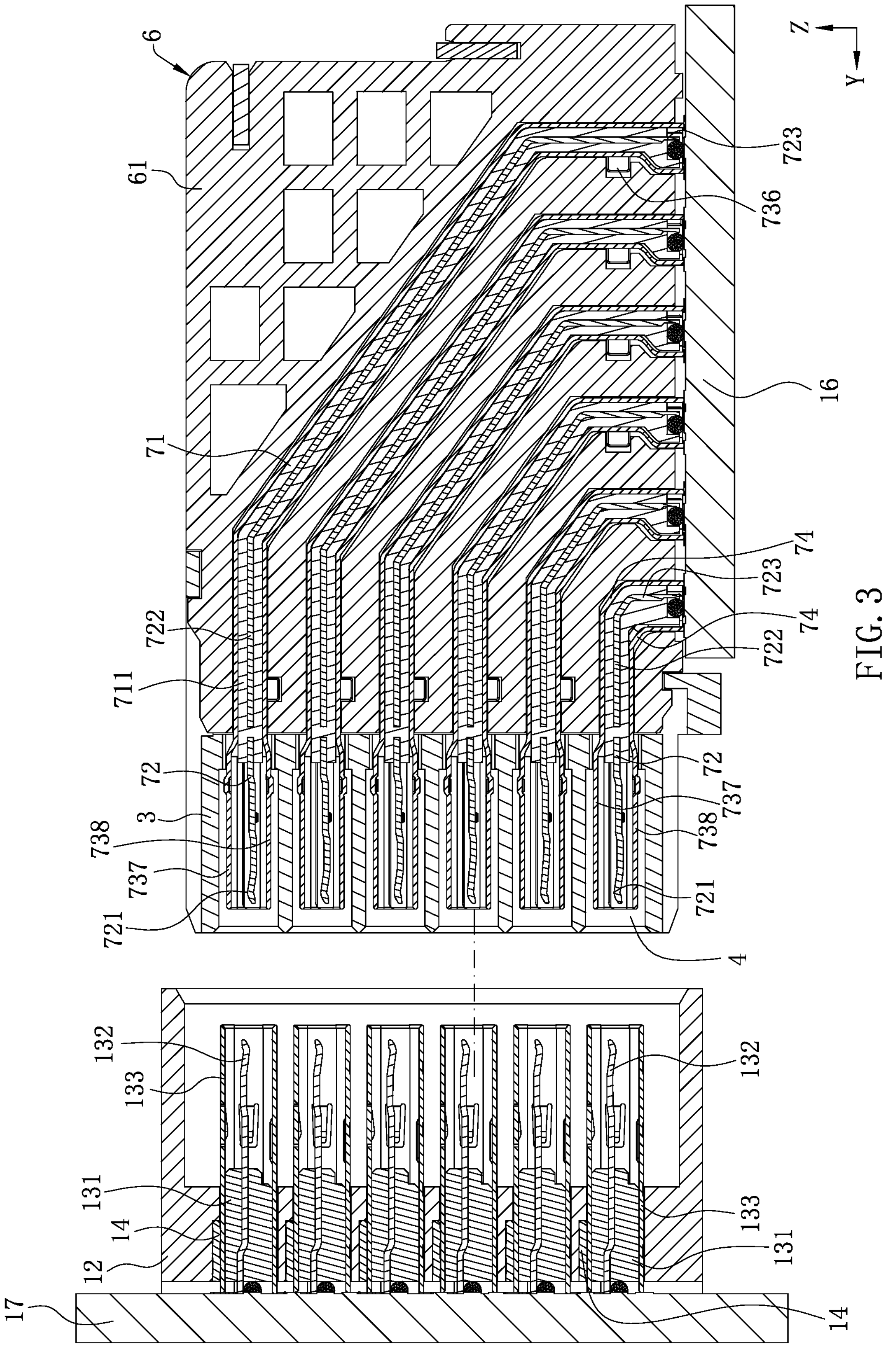
FIG. 3 is a sectional view of the electrical connector and the mating connector of the electrical connector assembly prior to mating according to the first embodiment of the present invention.
Figure 4:
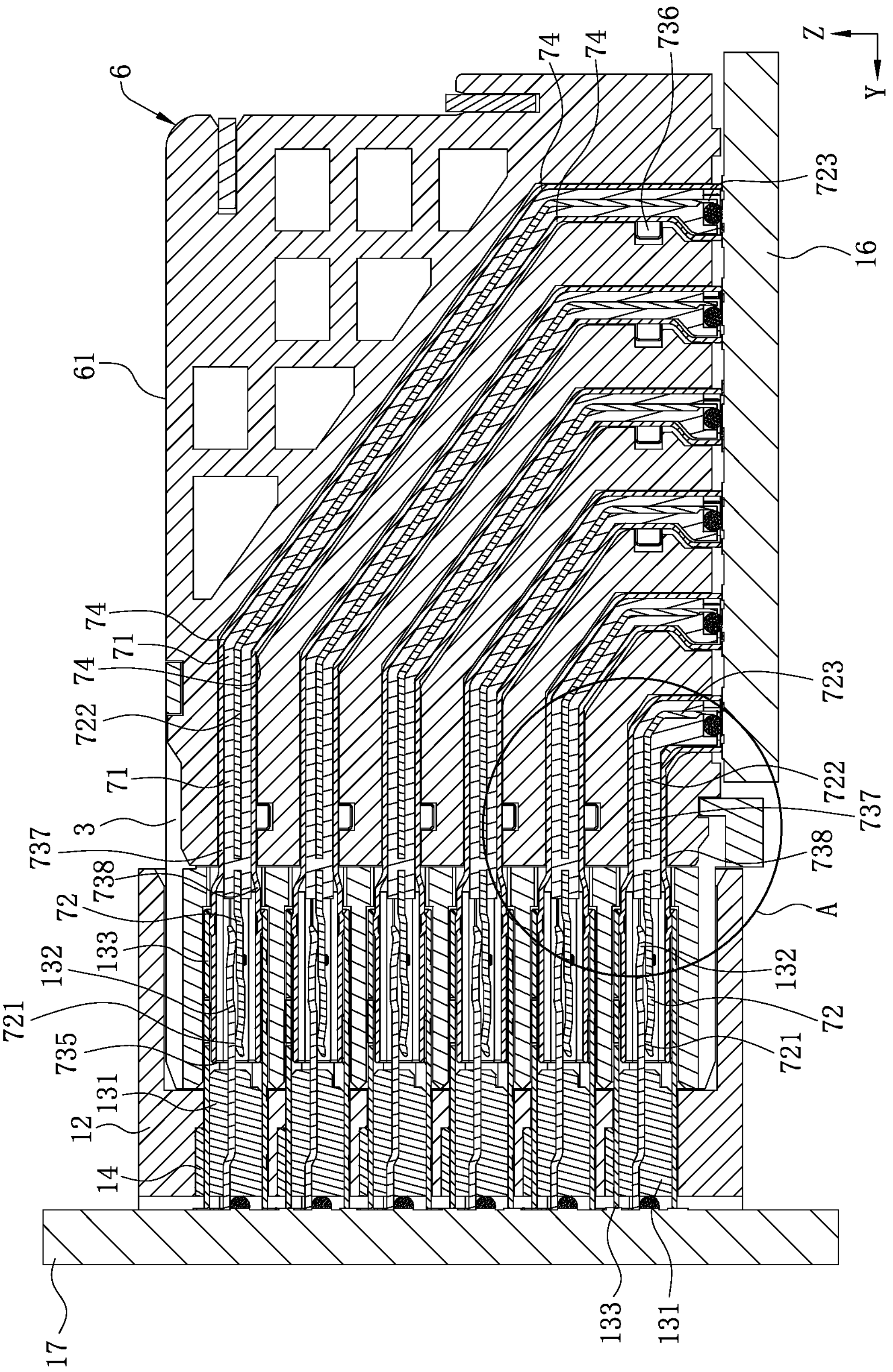
FIG. 4 is a sectional view of the electrical connector and the mating connector of the electrical connector assembly after completion of mating according to the first embodiment of the present invention.
Figure 5:
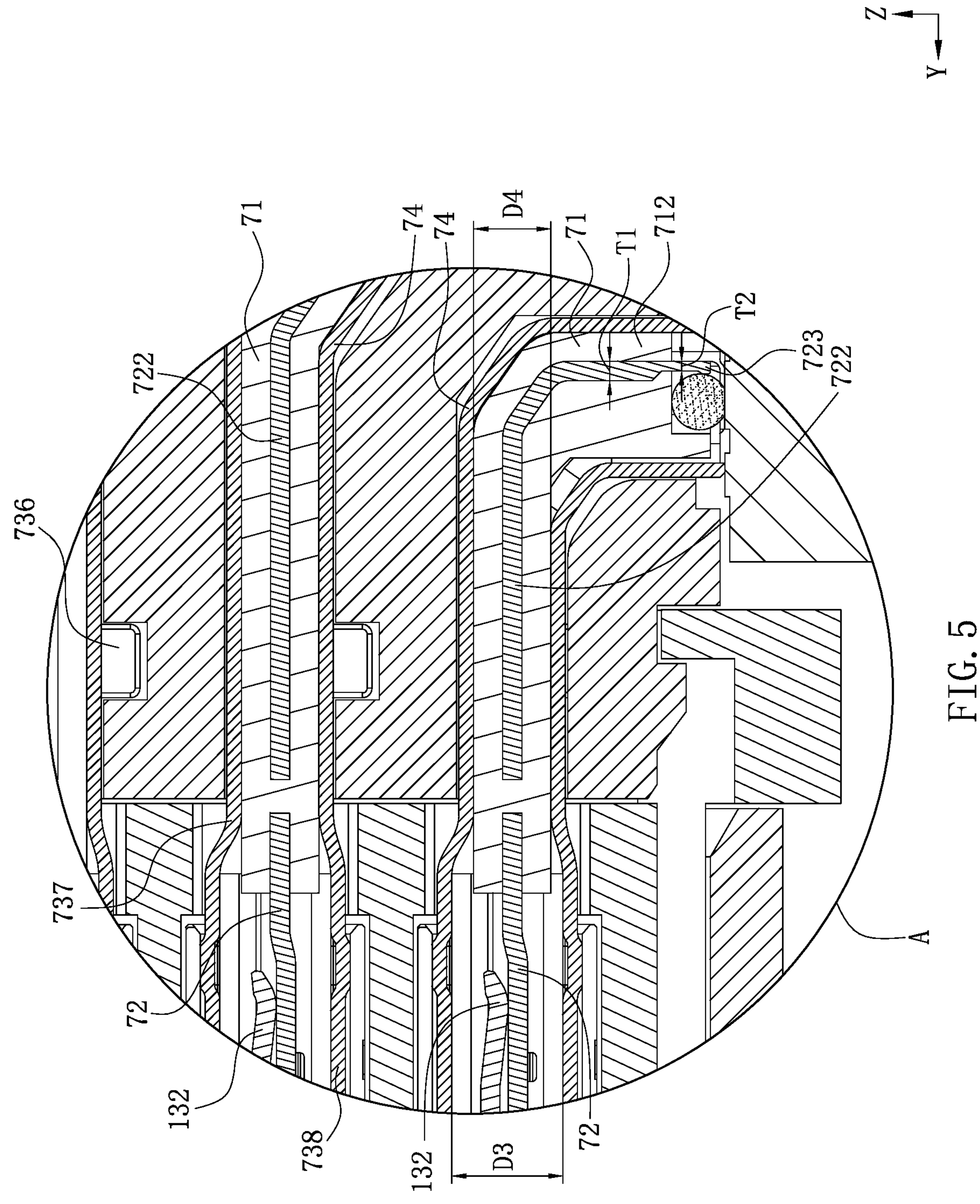
FIG. 5 is an enlarged view of a portion A in FIG. 4.
Figure 6:
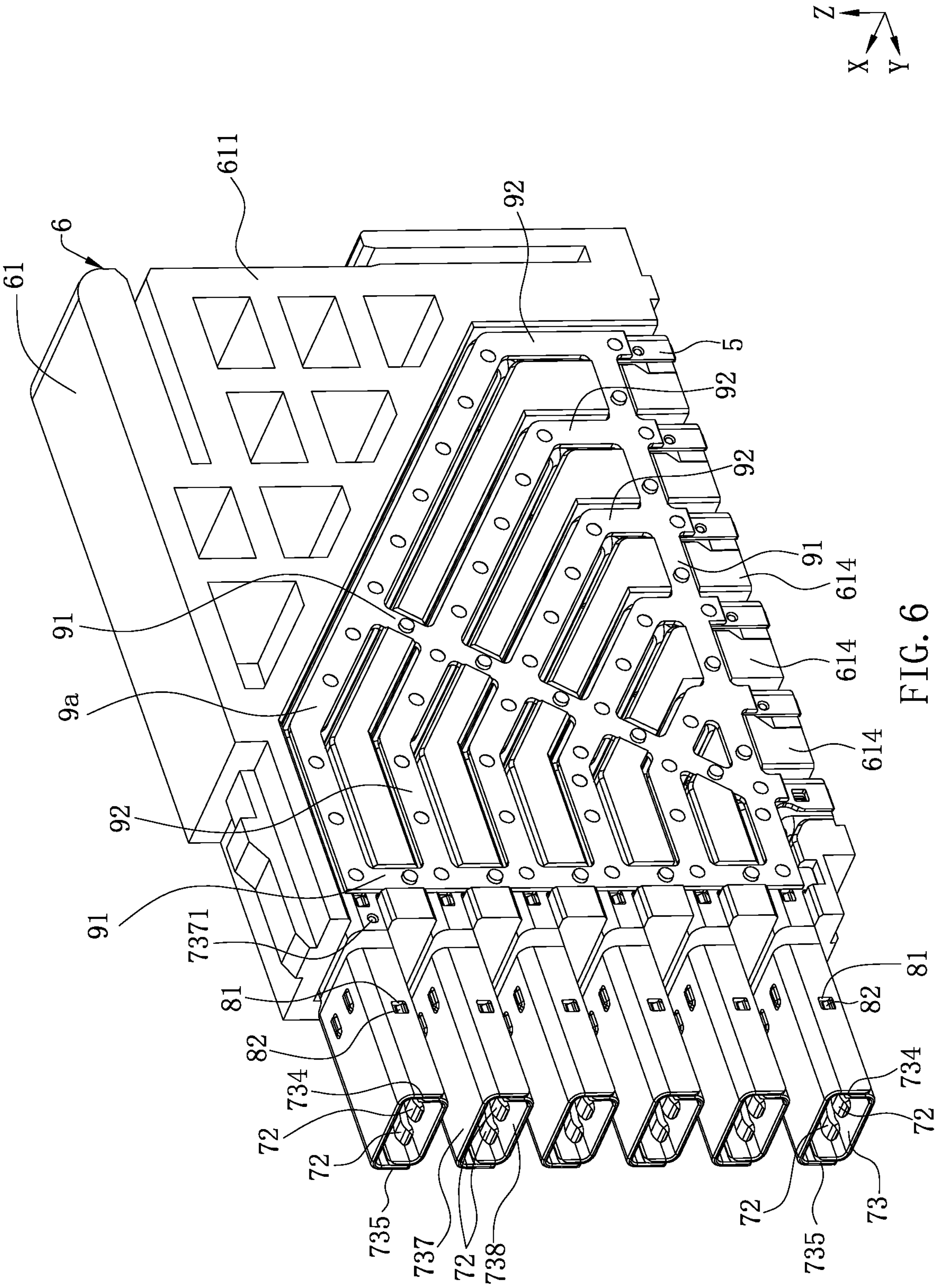
FIG. 6 is a perspective view of an electrical module according to the first embodiment of the present invention.
Figure 7:
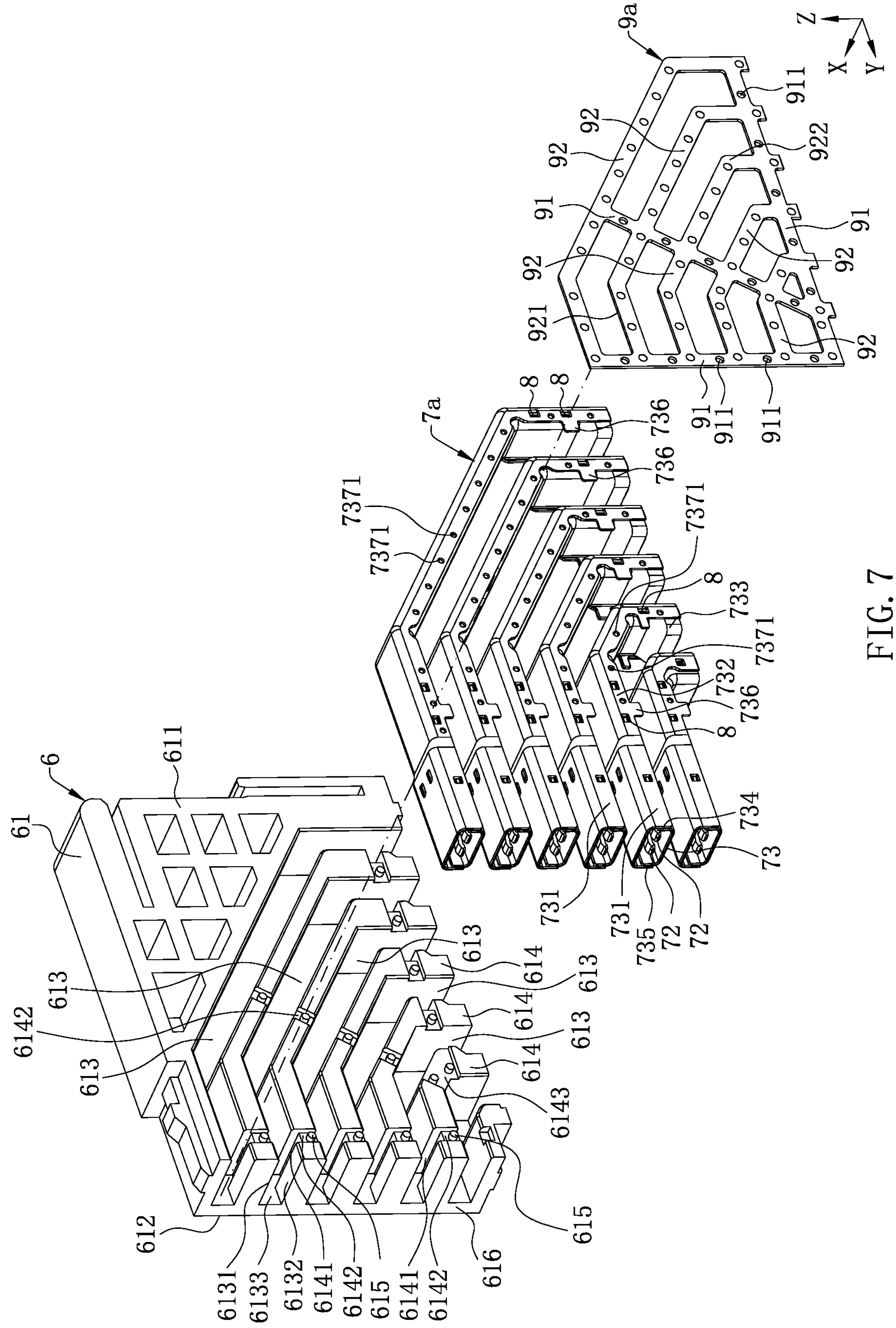
FIG. 7 is a disassembled view of an electrical module according to the first embodiment of the present invention.
Figure 8:
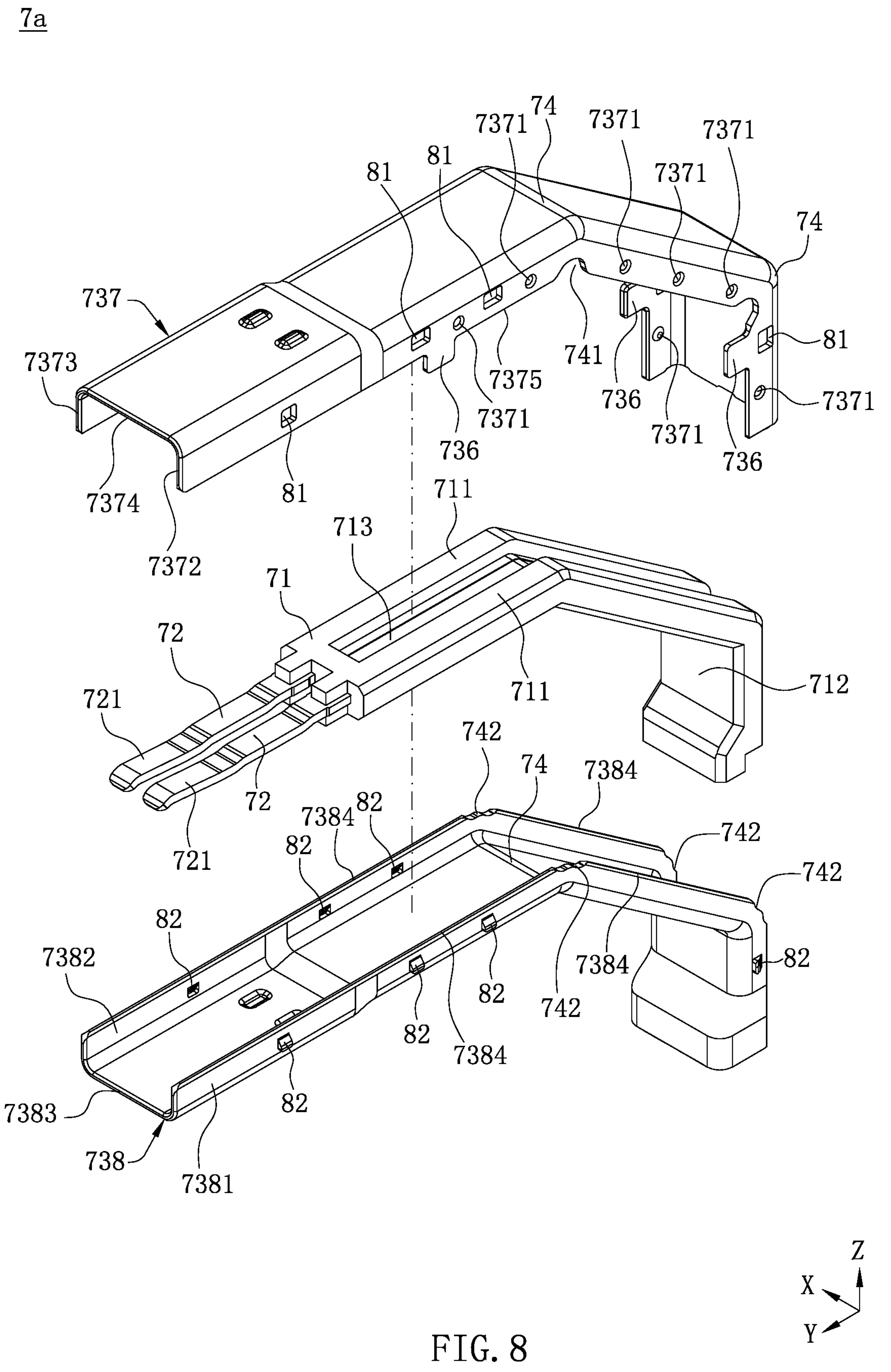
FIG. 8 is a disassembled view of a first terminal assembly according to the first embodiment of the present invention.
Figure 9:
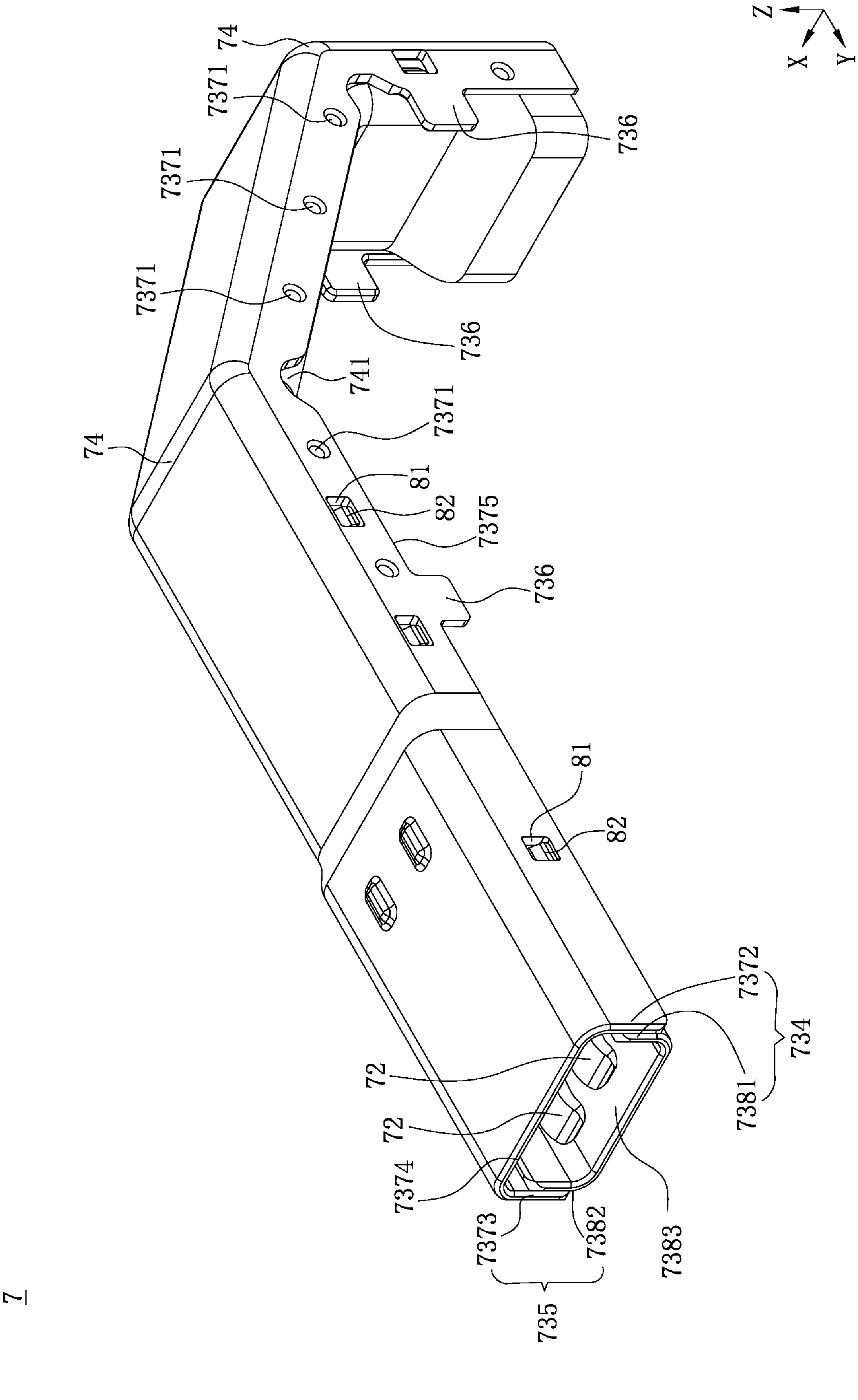
FIG. 9 is a perspective assembled view of the first terminal assembly as shown in FIG. 8.
Figure 10:
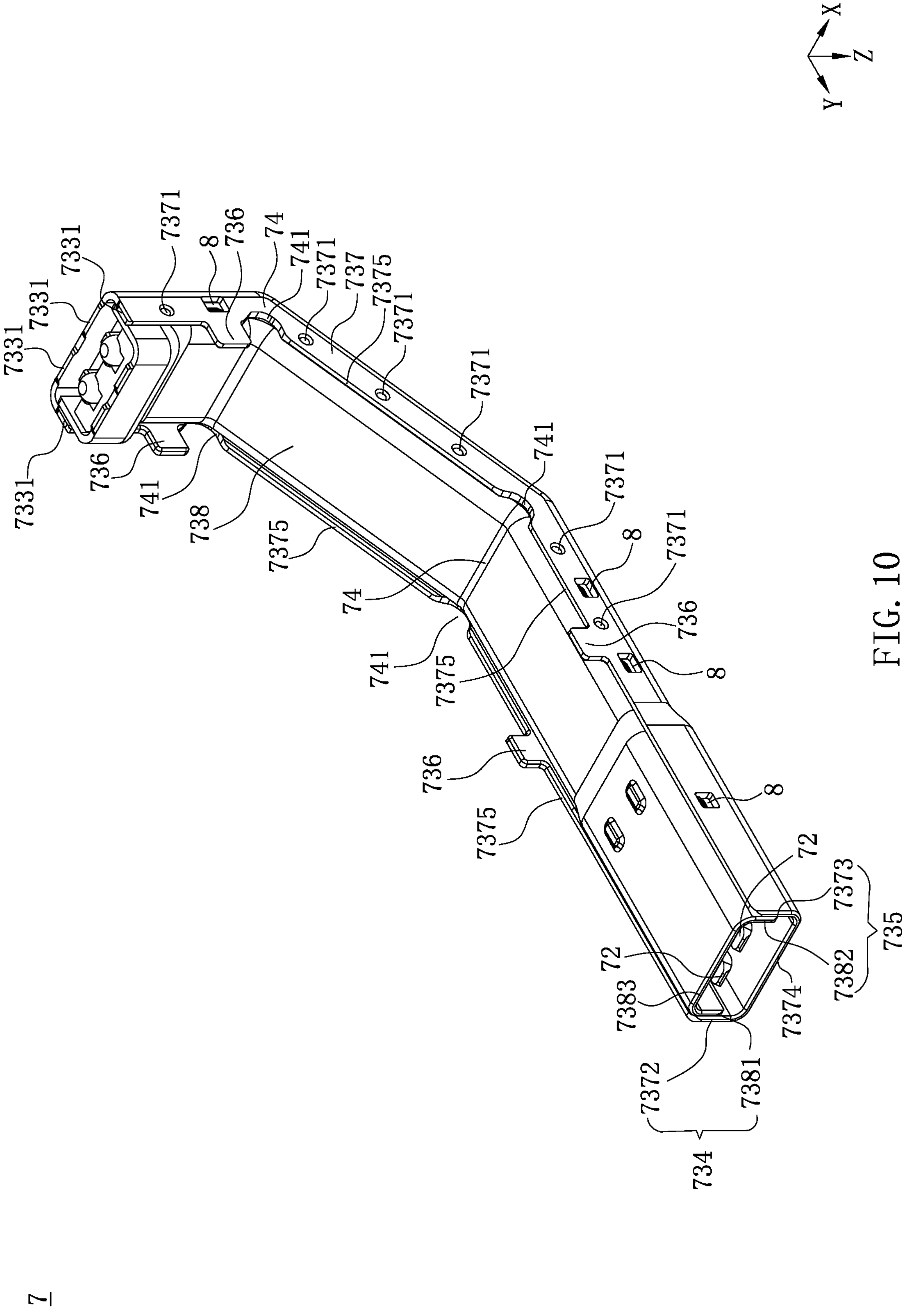
FIG. 10 is a perspective view of a first terminal assembly according to the first embodiment of the present invention in another viewing angle.
Figure 11:
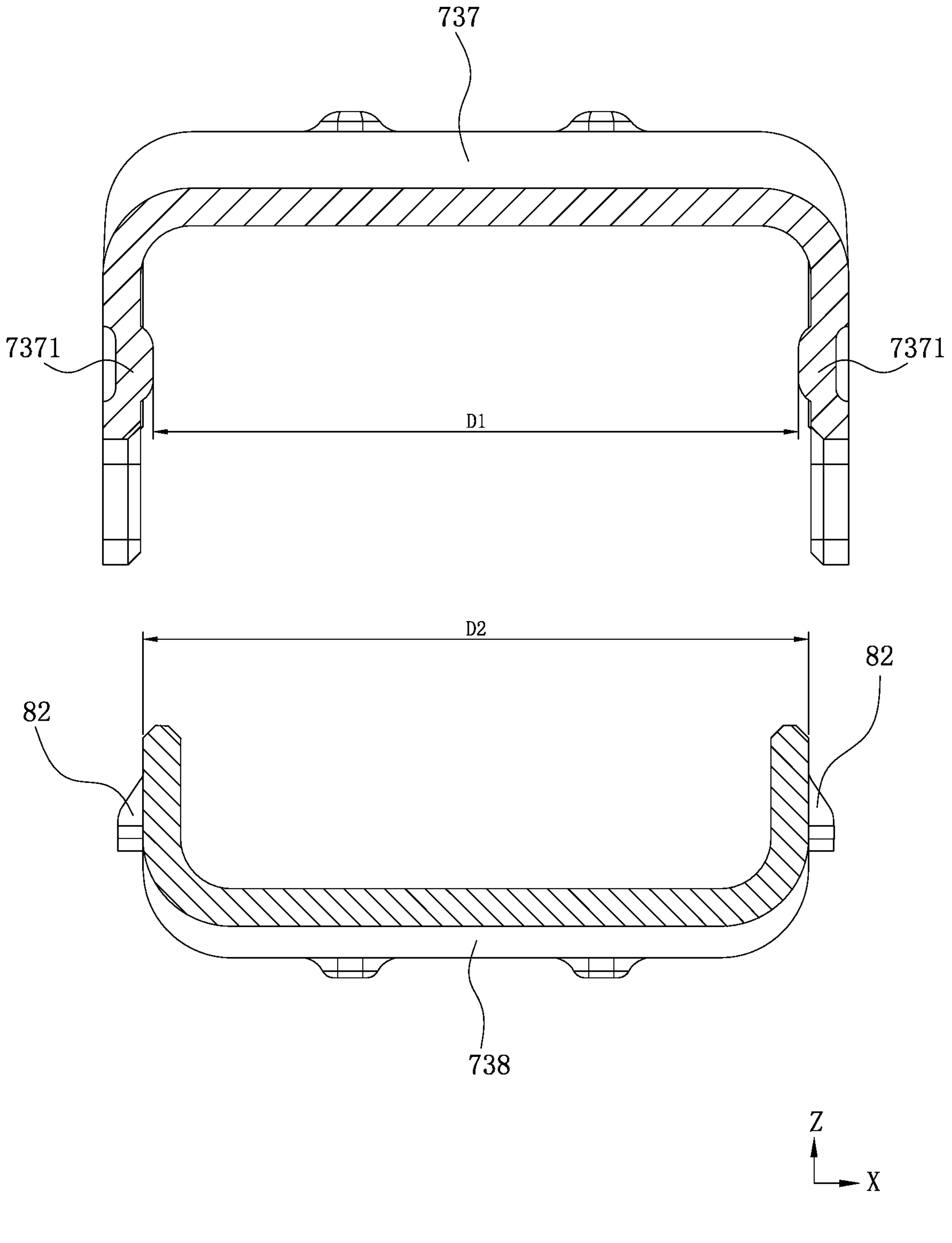
FIG. 11 is a sectional view of a first shielding member and a second shielding member being not matched and fixed according to the first embodiment of the present invention.
Figure 12:
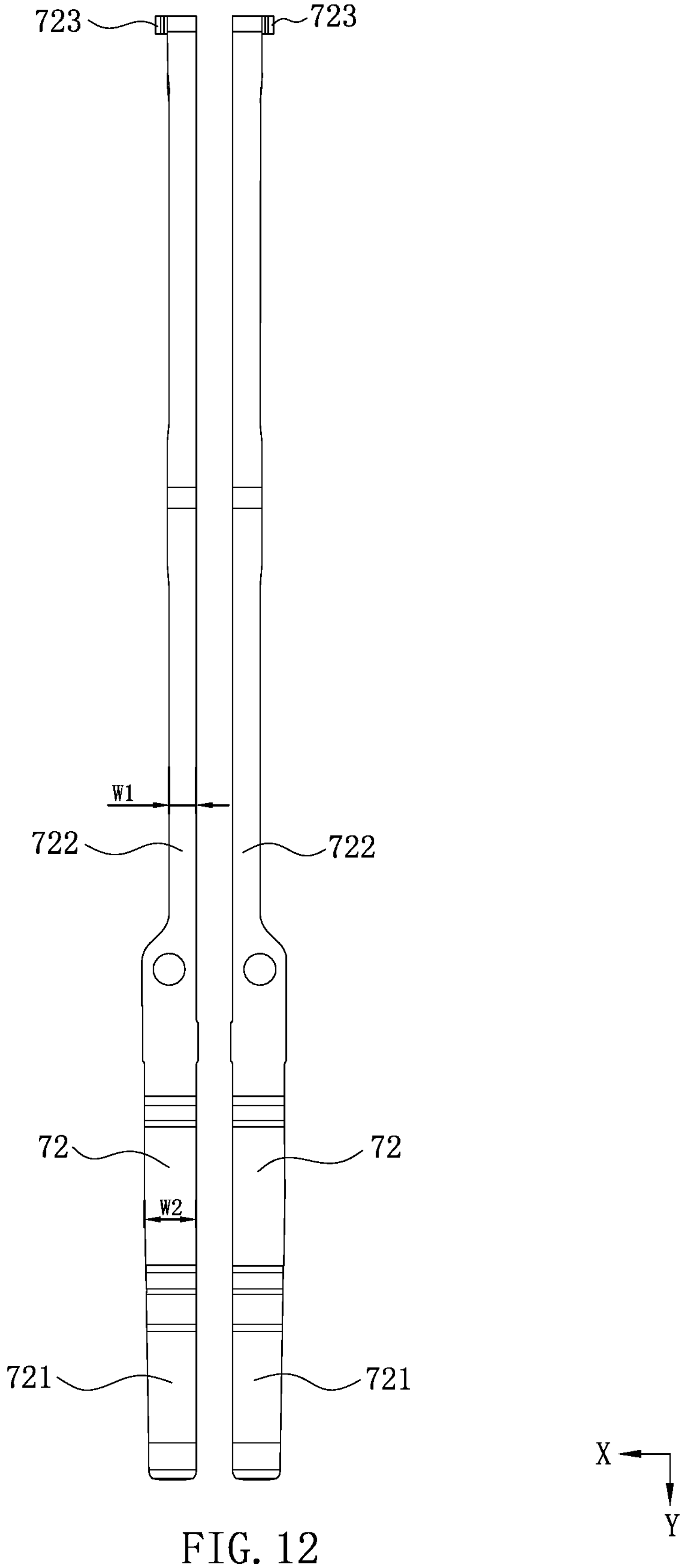
FIG. 12 is a top view of a pair of first signal terminals according to the first embodiment of the present invention.
Figure 13:
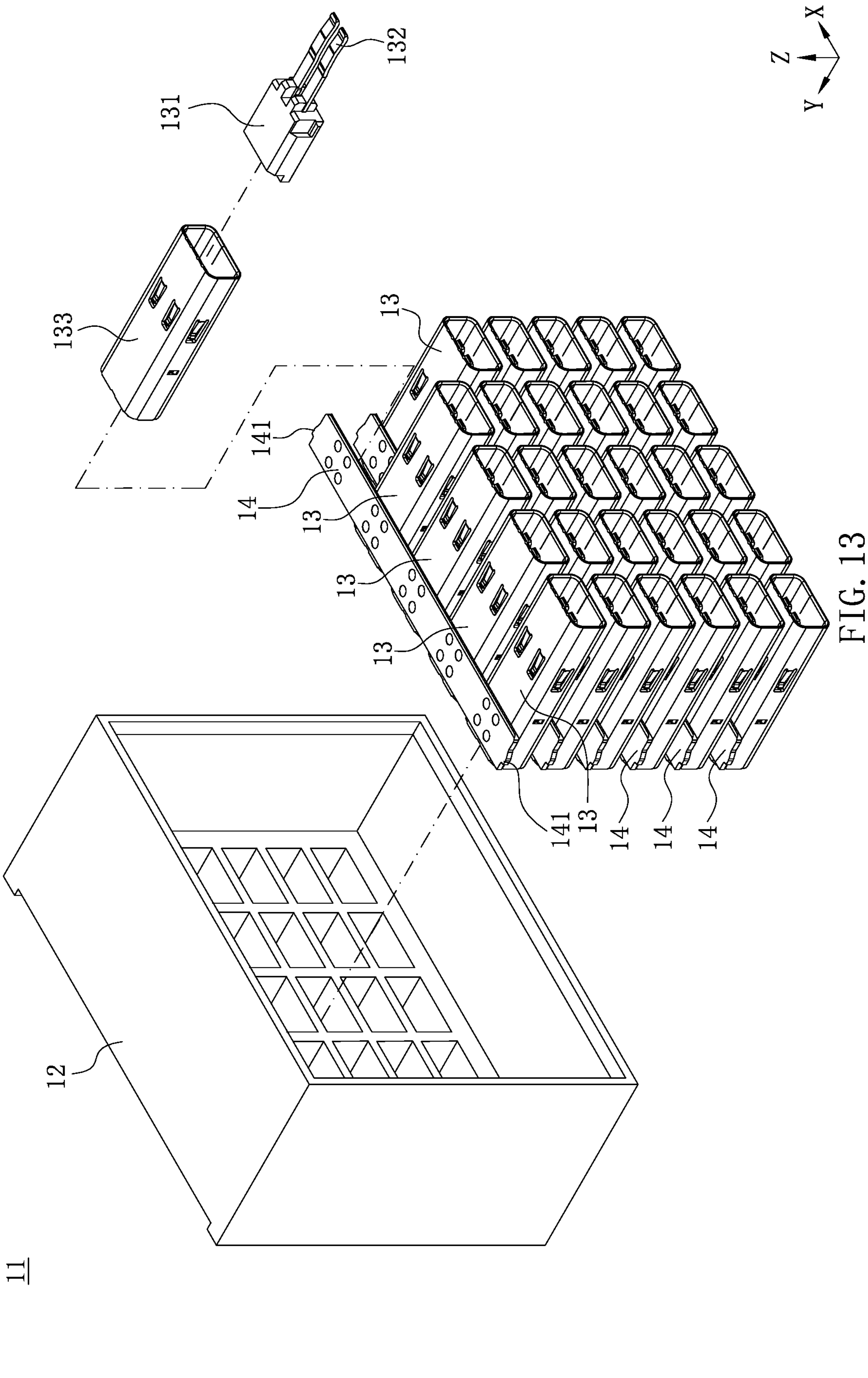
FIG. 13 is a disassembled view of the mating connector according to the first embodiment of the present invention.

Referring to FIG. 2, FIG. 5 and FIG. 7, in the electrical connector 2, each electrical module 6 includes an insulating body 61, a plurality of first terminal assemblies 7 and a first grounding member 9*a*. The insulating body 61 has a first side 611 and a second side 612 opposite to each other in the first direction X. The insulating body 61 has a plurality of first accommodating slots 613 and a plurality of first partition portions 614. The first accommodating slots 613 are concavely provided on the first side 611 of the insulating body 61 toward the second side 612 and are arranged along the second direction Z. The first partition portions 614 and the first accommodating slots 613 are provided on the insulating body 61 alternately along the second direction Z. The first terminal assemblies 7 are respectively accommodated in the corresponding first accommodating slots 613. One of the first partition portions 614 is provided between two adjacent first accommodating slots 613 to separate the two adjacent first terminal assemblies 7. Each first terminal assembly 7 includes a first insulating block 71, a pair of first signal terminals 72 fixed to the first insulating block 71, and a first shielding shell 73 covering the first insulating block 71 and the first signal terminals 72. The first grounding member 9*a* is adjacent to the first side 611 of the insulating body 61, and the first grounding member 9*a* is in mechanical contact with and fixed to the first shielding shells 73 of the first terminal assemblies 7. The first grounding member 9*a* has a plurality of first spokes 91 and a plurality of second spokes 92. Each first spoke 91 corresponds to the first shielding shells 73 of a same electrical module 6, and the second spokes 92 one-to-one correspond the first shielding shells 73. In one embodiment, each first spoke 91 is in mechanical contact with the first shielding shells 73 of the same electrical module 6, and the second spokes 92 are correspondingly fixed to the first shielding shells 73. A side edge of each second spoke 92 and at least one of the first spokes 91 are cross-connected. It should be noted that, in the first embodiment, each first grounding member 9*a* has three first spokes 91, and the quantity of the second spokes 92 is equal to the quantity of the first terminal assemblies 7 of each electrical module 6. In other embodiments, the quantity of the first spokes 91 of the first grounding member 9*a* is not limited to three, and may be other quantity, which is not hereinafter limited.

Referring to FIG. 6 to FIG. 10, in each electrical module 6, each first accommodating slot 613 has a side wall surface 6133 in the first direction X, and a first wall 6131 and a second wall 6132 provided opposite to each other in the second direction Z. The first shielding shell 73 of each first terminal assembly 7 has a first shielding side surface 734 and a second shielding side surface 735 provided opposite to each other along the first direction X. The first shielding side surface 734 is exposed to the first side 611 of the insulating body 61. The second shielding side surface 735 of the first shielding shell 73 is limited by the side wall surface 6133 of the corresponding first accommodating slot 613 along the first direction X. The first grounding member 9*a* shields an outer side of the first shielding side surface 734 and is adjacent to the first side 611 of the insulating body 61. A plate surface 922 of each second spoke 92 extends along the first shielding side surface 734 of a corresponding first shielding shell 73 and is in contact with the corresponding first shielding side surface 734. Thus, the first terminal assemblies 7 are accommodated in the first accommodating slots 613 of the insulating body 61, such that the insulating body 61 and the first terminal assemblies 7 may be conveniently assembled and detached, thereby allowing assembling or repairing and replacing any damaged first terminal assemblies 7. The first shielding shell 73 of each first terminal assembly 7 covers a corresponding pair of the first signal terminals 72, thus reducing the signal crosstalk between two adjacent pairs of the first signal terminals 72. Each first spoke 91 of the first grounding member 9*a* is in mechanical contact with the first shielding shells 73 of a same electrical module 6, allowing the first shielding shells 73 of the same electrical module 6 to be conductively connected, such that the first shielding shells 73 of the same electrical module 6 have the same electrical potential, thus improving the shielding effect of the first shielding shells 73 of the same electrical module 6, and enhancing the high frequency characteristics of the electrical connector 2. The plate surface 922 of each second spoke 92 of the first grounding member 9*a* extends along the first shielding side surface 734 of the corresponding first shielding shell 73 and is in contact and mechanically fixed with the corresponding first shielding side surface 734, thus increasing the contact area of the first shielding shells 73 and the first grounding member 9*a*, ensuring the electrical conductive connection between the first shielding shells 73 and the first grounding member 9*a*, and enhancing the high frequency characteristics of the electrical connector 2. Meanwhile, the second spokes 92 may further stop the first shielding shells 73 along the first direction X, thus preventing the first shielding shells 73 from excessive displacement along the first direction X or even detaching from the first accommodating slots 613. Further, the first grounding member 9*a* increases transmission paths for the grounding of the first shielding shells 73, allowing the noise signals to be conducted out of the electrical connector 2 more quickly. Compared to the case where the first grounding member 9*a* is only provided with a plurality of first spokes 91, in certain embodiments of the present invention, a side edge 921 of each second spoke 92 of the first grounding member 9*a* and at least one of the first spokes 91 are cross-connected, such that the structure of the first grounding member 9*a* is stable, and the first spokes 91 do not easily deform. It should be noted that, in the first embodiment, the first shielding shell 73 is formed as a whole enclosed tube structure by matching the first shielding member 737 and the second shielding member 738. In other embodiments, the first shielding shell 73 may be formed by a single tube structure, and is thus not hereinafter limited.

Referring to FIG. 6 to FIG. 10, in each electrical module 6, one of each first shielding shell 73 and a corresponding adjacent first partition portion 614 is protrudingly provided with one insertion portion 736 or two insertion portions 736, and the other of each first shielding shell 73 and a corresponding adjacent first partition portion 614 is concavely provided with one first fixing slot 6141 or two first fixing slots 6141 to match and fix with the insertion portions 736. Thus, the position of the first shielding shell 73 may be limited by the insertion portions 736 and the first fixing slots 6141, reducing the displacement of the first shielding shell 73 relative to the insulating body 61, and providing structural stability of the electrical connector 2. In the first embodiment, the first shielding side surface 734 and the second shielding side surface 735 of each first shielding shell 73 are both provided with the insertion portions 736, and the corresponding first partition portions 614 are provided with first fixing slots 6141. In other embodiments, the insertion portions 736 may be provided at other locations of the first shielding shell 73, as long as they may match with the first fixing slots 6141 of the corresponding first partition portion 614. Alternatively, the insertion portions 736 may be provided on the first partition portion 614, and the corresponding first fixing slots 6141 are provided on the corresponding first shielding shell 73, which is not hereinafter limited. In the first embodiment, the insertion portions 736 may at least limit the displacement of the first shielding shell 73 relative to the insulating body 61 in the third direction Y. Each first fixing slot 6141 extends along the first direction X. The insertion portion 736 of the first shielding side surface 734 and the insertion portion 736 of the second shielding side surface 736 located at a same location are accommodated altogether in the same first fixing slot 6141.

Referring to FIG. 6 to FIG. 10, in each electrical module 6, the first shielding side surface 734 of each first shielding shell 73 is protrudingly provided with two insertion portions 736. The two insertion portions 736 of each first shielding shell 73 are protrudingly provided respectively along the extending directions of two first spokes 91 of the first spokes 91. The corresponding first partition portion 614 is correspondingly provided with two first fixing slots 6141. The insertion portions 736 of the first shielding shells 73 located in the same electrical module 6 are arranged along the extending directions of the two first spokes 91 and are exposed to the first side 611 of the insulating body 61. The plate surface of at least one of the first spokes 91 shields and is in contact with the corresponding insertion portions 736 along the first direction X. Thus, each first spoke 91 is further in contact to the insertion portions 736 of the corresponding first shielding shell 73, thus increasing the contact area of the first shielding shells 73 and the first grounding member 9*a*, ensuring the electrical conductive connection between the first shielding shells 73 and the first grounding member 9*a*, and enhancing the high frequency characteristics of the electrical connector 2. Meanwhile, the first spokes 91 shield the insertion portions 736 along the first direction X, thus preventing the insertion portions 736 from being exposed and deformed such as bending or warping.

Referring to FIG. 5 to FIG. 9, in a same electrical module 6, the first partition portion 613 between the two adjacent first accommodating slots 613 is provided with three fixing recesses 6142 corresponding to the three first spokes 91. Each of the three fixing recesses 6142 functions as a second fixing slot, and is thus hereinafter referred to as a second fixing slot 6142. Each second fixing slot 6142 runs through the first partition portion 614 along the extending direction of the corresponding first spoke 91, and multiple second fixing slots 6142 are arranged along the extending direction of each first spoke 91. Each first spoke 91 is accommodated in the second fixing slots 6142 arranged along the extending direction thereof, and each second spoke 92 is accommodated in the corresponding first accommodating slot 613. Thus, the first spokes 91 are accommodated in the second fixing slots 6142, and the second spokes 92 are accommodated in the first accommodating slots 613, providing certain position limiting functions to the first grounding member 9*a*. Further, the first grounding member 9*a* is embedded into the insulating body 61, such that when the first terminal assemblies 7 are sequentially stacked along the first direction X, the insulating bodies 61 of two adjacent first terminal assemblies 7 may lean tightly to each other, thus increasing the tight overall structural of the electrical connector 2. It should be noted that, in the first embodiment, each first grounding member 9*a* has three first spokes 91, and correspondingly, to accommodate each first spoke 91, each first partition portion 614 is provided with three second fixing slots 6142. However, in other embodiments, the quantity of the first spokes 91 of each first grounding member 9*a* may be another quantity, and correspondingly, the quantity of the second fixing slots 6142 of each first partition portion 614 is not limited to three, and may be another quantity. Further, a protruding portion 615 is protrudingly provided on the slot wall surface 6143 of each second fixing slot 6142 toward the first side 611 of the insulating body 61. Each first spoke 91 is provided with a plurality of through holes 911 to respectively match and fix with the protruding portions 615. Thus, since the second shielding side surface 735 of the first shielding shell 73 is limited by the side wall surface 6133 of the corresponding first accommodating slot 613 along the first direction X, the first spokes 91 of the first grounding member 9*a* and the protruding portions 615 of the insulating body 61 are fixed to each other through the through holes 911 to limit the position of the first shielding side surface 734 of the first shielding shell 73, such that each first shielding shell 73 is clamped between the side wall surface 6133 of the corresponding first accommodating slot 613 and the first grounding member 9*a*, and the first shielding shells 73, the first grounding member 9*a* and the insulating body 61 form a stable overall structure, further enhancing the structural stability of the electrical connector 2, preventing the mating of the electrical connector 2 and the mating connector 11 from being affected due to the unstable structure of the electrical connector 2, and ensuring the normal usage of the electrical connector 2.

Referring to FIG. 7 to FIG. 11, each first shielding shell 73 has a first shielding side surface 734 and a second shielding side surface 735 provided opposite to each other along the first direction X. Each first shielding shell 73 includes a first shielding member 737 and a second shielding member 738, and the first shielding member 737 and the second shielding member 738 are U-shaped structures provided opposite to each other. The first shielding member 737 has two opposite side surface, and the two opposite side surfaces of the first shielding member 737 are the first side surface 7372 and the second side surface 7373. The first shielding member 737 further includes a first shielding surface 7374, and the first shielding surface 7374 is located between the first side surface 7372 and the second side surface 7373 provided opposite to each other. The second shielding member 738 has two opposite outer side surfaces, and the two opposite outer side surfaces of the second shielding member 738 are the third side surface 7381 and the fourth side surface 7382. The second shielding member 738 further includes a second shielding surface 7383, and the second shielding surface 7383 is located between the third side surface 7381 and the fourth side surface 7382 provided opposite to each other. In the first embodiment, the first side surface 7372 and the third side surface 7381 are coupled by a fixing mechanism 8 to collectively form the first shielding side surface 734 of the first shielding shell 73. The second side surface 7373 and the fourth side surface 7382 are coupled by a fixing mechanism 8 to collectively form the second shielding side surface 735 of the first shielding shell 73. The first shielding surface 7374 and the second shielding surface 7383 are provided opposite to each other in the second direction Z. In the first embodiment, the two opposite shielding surfaces of the first shielding shell 73 in the second direction Z are the first shielding surface 7374 and the second shielding surface 7383. The two opposite side surfaces of the first shielding member 737 (i.e., the first side surface 7372 and the second side surface 7373) cover and are fixed to the two opposite outer side surfaces of the second shielding member 738 (i.e., the third side surface 7381 and the fourth side surface 7382). The two opposite side surfaces of the first shielding member 737 and the two opposite outer side surfaces of the second shielding member 738 are fixed by multiple fixing mechanisms 8. Specifically, the first side surface 7372 and the third side surface 7381 are fixed by multiple fixing mechanisms 8, and the second side surface 7373 and the fourth side surface 7382 are fixed by multiple fixing mechanisms 8. The insertion portions 736 are formed by protruding from the edges 7375 of the two opposite side surfaces of the first shielding member 737 (i.e., the first side surface 7372 and the second side surface 7373) toward an adjacent first partition portion 614. The plate surface 922 of each second spoke 92 shields at least one of the fixing mechanisms 8 in the first direction X. Specifically, in the first embodiment, the plate surface 922 of each second spoke 92 shields at least one of the fixing mechanisms 8 located on the first shielding side surface 734. In the first embodiment, each fixing mechanism 8 includes a fixing hole 81 provided on the first side surface 7372 or the second side surface 7373 of the first shielding member 737 and a fixing protrusion 82 provided on the third side surface 7381 or the fourth side surface 7382 of the second shielding member 738. Each fixing protrusion 82 is limited by the corresponding fixing hole 81. In other embodiments, the fixing mechanism 8 may be other structures, such as buckling mechanisms (not shown) or clamping structures (not shown). Thus, the first shielding shell 73 is formed by the two U-shaped structures of the first shielding member 737 and the second shielding member 738, allowing the pair of the first signal terminals 72 being covered by the first insulating block 71 to be easily assembled into the first shielding shell 73. Further, the plate surface 922 of each second spoke 92 shields a portion of the fixing mechanisms 8, thus shielding the gaps existing in the locations of the fixing mechanisms 8, reducing signal leakages, and enhancing the high frequency characteristics of the electrical connector 2. Further, each of the first shielding member 737 and the second shielding member 738 is provided with a bending section at a same location. An edge 7375 of the bending section 74 of the first shielding member 737 is concavely provided with a first notch 741, and an edge 7384 of the bending section 74 of the second shielding member 738 is concavely provided with a second notch 742. In the first embodiment, the concave directions of the first notch 741 and the second notch 742 at the same location are opposite to each other. The second notch 742 is covered by the bending section 74 of the first shielding member 737. The first notch 741 is located at an outer side of the side surfaces 734 and 735 of the bending section 74 of the second shielding member 738, and is not communicated with the second notch 742. Thus, the first notch 741 prevents the bending section 74 of the first shielding member 737 from forming wrinkles, and the second notch 742 prevents the bending section 74 of the second shielding member 738 from pulling and tearing, thus facilitating the bending and forming of the first shielding member 737 and the second shielding member 738. Further, the second notch 742 is covered by the bending section 74 of the first shielding member 737, and the first notch 741 and the second notch 742 are not in communication, thus preventing the first shielding shell 73 to generate gaps at the bending sections 74, such that the bending sections 74 may surround the first signal terminals 72, thereby reducing the interference between the two pairs of the first signal terminals 72, and enhancing the high frequency characteristics of the electrical connector 2.

Referring to FIG. 7 to FIG. 11, each first shielding member 73 has a plurality of pairs of contact protruding points 7371. For each pair of the contact protruding points 7371, the two contact protruding points 7371 are provided on the two opposite side surfaces (i.e., the first side surface 7372 and the second side surface 7373) of the first shielding member 737 and are protruding toward each other. A distance between the two contact protruding points 7371 of each pair in the first direction X is defined as a first distance D1, and a distance between the two opposite outer side surfaces (i.e., the third side surface 7381 and the fourth side surface 7382) of the second shielding member 738 in the first direction X is defined as a second distance D2. When the first shielding member 737 is not matched and fixed with the corresponding second shielding member 738, the first distance D1 is less than the second distance D2. When the first shielding member 737 is fixed with the second shielding member 738, the two contact protruding points 7371 of each pair are respectively in contact with the two opposite outer side surfaces 734 and 735 of the second shielding member 738, and the first distance D1 is equal to the second distance D2. With such configuration, when fixing of the first shielding member 737 and the second shielding member 738 is complete, each pair of the contact protruding points 7371 of the first shielding member 737 functions to clamp the second shielding member 738, thus better fixing the first shielding member 737 and the second shielding member 738. Meanwhile, by the contact protruding points 7371, the contact locations between the first shielding member 737 and the second shielding member 738 are increased, thus ensuring the first shielding member 737 and the second shielding member 738 to be conductively connected.

Referring to FIG. 2 to FIG. 4 and FIG. 7 to FIG. 10, multiple electrical modules 6 are provided, and are arranged in parallel along the first direction X. The two first signal terminals 72 of each first terminal assembly 7 located in the same electrical module 6 are arranged in parallel along the first direction X. Each first signal terminal 72 of each first terminal assembly 7 has a first contact portion 721, a first conductive portion 723 and a first connecting portion 722 located between the first contact portion 721 and the first conductive portion 723. The first contact portion 721 extends from one end of the first connecting portion 722 along the third direction Y and is used to be in contact with a corresponding mating terminal 132 of the mating connector 11 in the second direction Z. The first insulating block 71 covers the first connecting portions 722 of the corresponding pair of the first signal terminals 72. The first conductive portion 723 of each first signal terminal 72 protrudes out of the first insulating block 71 along the second direction Z to be soldered to the second base plate 17. Each first shielding shell 73 has a main body portion 732 accommodated in the corresponding first accommodating slot 613, an enlarged portion 731 extending from one end of the main body portion 732 along the third direction Y, and a tail portion 733 extending from the other end of the main body portion 732 along the second direction Z. The enlarged portion 731 surrounds the first contact portions 721 of the corresponding pair of the first signal terminals 72. A distance between two shielding surfaces of the enlarged portion 731 opposite to each other in the second direction Z is defined as a third distance D3, and a distance between two shielding surfaces of the main body portion 732 opposite to each other in the second direction Z is defined as a fourth distance D4. The third distance D3 is greater than the fourth distance D4. The enlarged portion 731 of each first shielding shell 73 is in contact with the corresponding mating shielding shell 133. It should be noted that, in the first embodiment, the first shielding shell 73 is formed by providing the U-shaped structure of the first shielding member 737 and the U-shaped structure of the second shielding member 738 opposite to each other. Thus, the two shielding surfaces of the first shielding shell 73 opposite to each other in the second direction Z are the first shielding surface 7374 of the first shielding member 737 and the second shielding surface 7383 of the second shielding member 738. Thus, the third distance D3 is greater than the fourth distance D4, such that the distance between the first contact portion 721 and the enlarged portion 731 is increased, thus preventing each mating terminal 132 from being in contact with the first shielding shell 73 and short-circuiting after completion of mating with the corresponding first signal terminal 72. In addition, since the first contact portion 721 of the first signal terminal 72 overlaps and adds the thickness of the contact portion of the mating terminal 132, the impedance of the first contact portion 721 of the first signal terminal 72 is relatively reduce. Moreover, the enlarged portion 731 increases the distance between the first shielding shell 73 and the first contact portion 721 of the first signal terminal 72, thus adjusting the impedance of the first contact portion 721 of the first signal terminal 72, improving the impedance consistency of the first signal terminals 72, and facilitating signal transmission. Further, the tail portion 733 is located in the corresponding first accommodating slot 613 and is adjacent to the mounting end 5 of the electrical connector 2. A distance between the two opposite shielding surface of the tail portion 733 in the third direction Y is greater than a distance between the two opposite shielding surface of the main body portion 732 in the third direction Y. The conductive portions 723 of each pair of the first signal terminals 72 are covered by the tail portion 733 of the corresponding first shielding shell 73. The tail portion 733 of each first shielding shell 73 is protrudingly provided with a plurality of mounting portions 7331 to be electrically connected to the first base plate 16. The mounting portions 7331 of each first shielding shell 73 are located around the conductive portions 723 of a pair of the first signal terminals 72. With such configuration, the tail portion 733 of each first shielding shell 73 may reduce signal shielding to the first conductive portions 723 of two adjacent pairs of the first signal terminals 72, and increase the distance between the first shielding shell 73 and the first conductive portions 723, such that when the first conductive portions 723 are soldered to the first base plate 16 by solders, the first shielding shell 73 may be prevented from contacting the solders and causing short-circuiting to the first signal terminals 72. In the first embodiment, each first shielding shell 73 has three pairs of mounting portions 7331. Two pairs of the mounting portions 7331 are respectively located at two sides of the conductive portions 723 of the corresponding pair of the first signal terminals 72 in the third direction Y, and the other pair of the mounting portions 7331 are respectively located at two sides of the conductive portions 723 of the corresponding pair of the first signal terminals 72 in the first direction X.

Referring to FIG. 5, FIG. 7, FIG. 8 and FIG. 12, for each first terminal assembly 7, the first insulating block 71 has a first insulating surface 711 and a second insulating surface 712 provided opposite to each other in the second direction Z. The first insulating surface 711 of the first insulating block 71 is concavely provided with an exposure slot 713 toward the second insulating surface 712, and the exposure slot 713 extends along a length direction of the first connecting portion 722. A portion of the first connecting portion 722 protrudes and enter the exposure slot 713 along the first direction X, and another portion of the first connecting portion 722 is embedded in the first insulating block 71. For each first signal terminal 72, a width W1 of the first connecting portion 722 along the first direction X is less than a width W2 of the first contact portion 721 along the first direction X. Since the width W2 of the first contact portion 721 is greater, and the width W1 of the first connecting portion 722 is smaller, the contact area between each first signal terminal 72 and the corresponding mating terminal 132 is increased, and the overall width of each first signal terminal 72 is prevented from being excessively large to increase the overall structure of the electrical module 6, thus facilitating the light and thin design of the electrical connector 2. Further, since the widths of the first contact portion 721 and the first connecting portion 722 of each first signal terminal 72 are different, the impedances of the first contact portion 721 and the first connecting portion 722 of each first signal terminal 72 are different, and the impedance increases when the width decreases. The increase of impedance will lead to the increase of insertion loss. Thus, in order to balance the insertion loss of the first contact portion 721 and the first connecting portion 722 of the first signal terminal 72, this embodiment increases the air content around the first connecting part 722 by exposure slot 713, which can reduce the capacitive reactance of the first connecting portion 722 in order to reduce the insertion loss of the first connecting portion 722. Therefore, this embodiment can reduce the difference of the insertion loss between the first contact portion 721 and the first connecting portion 722 of the first signal terminal 72. Further, the first conductive portions 723 of multiple pairs of the first signal terminals 72 located in the same electrical module 6 are arranged along the third direction Y. The thickness T2 of the first conductive portion 723 along the third direction Y is less than the thickness T1 of the first connecting portion 722 along the third direction Y. The thickness T2 of the first conductive portion 723 is relatively smaller, thus providing more space for receiving the solder, ensuring the first conductive portion 723 to be stably soldered to the first base plate 16, preventing the solders of the first conductive portions 723 of a pair of the first signal terminals 72 from being in contact with each other in a smaller space, and preventing the pair of the first signal terminals 72 from short-circuiting and affecting the signal transmission.

FIG. 14 to FIG. 27 show a second embodiment of the present invention. For convenience of understanding, in the three-dimensional coordinate as shown in the accompanied drawings in the second embodiment, the X'-axis is defined as a first direction, the Z'-axis is defined as a second direction, and the Y'-axis is defined as a third direction. Any two of the X'-axis, the Y'-axis and the Z'-axis are perpendicular to each other.

Figure 14:
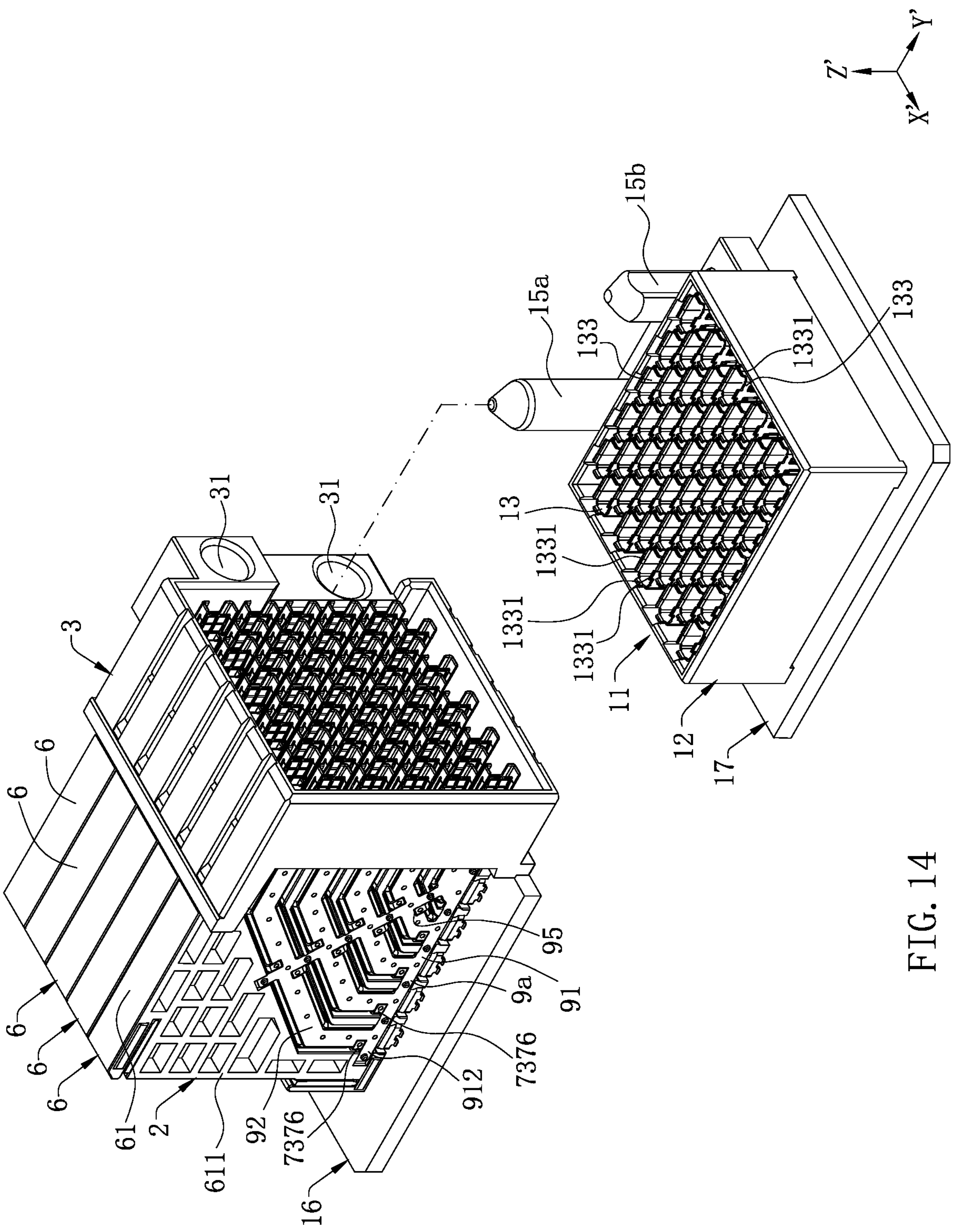
FIG. 14 is a perspective schematic view of an electrical connector assembly according to a second embodiment of the present invention.

FIG. 14 shows an electrical connector assembly 1 according to the second embodiment of the present invention, which includes an electrical connector 2, a mating connector 11 mated with the electrical connector 2, a first electrical component electrically connected to the electrical connector 2 and a second electrical component electrically connected to the mating connector 11. In the second embodiment, the first electrical component is a first base plate 16, and the second electrical component is a second base plate 17. In other embodiments, the first electrical component and the second electrical component may be both cables, or the first electrical component is the first base plate 16 and the second electrical component is a cable, or the first electrical component is a cable and the second electrical component is the second base plate 17. The first electrical component and the second electrical component may be other components, as long as they can be electrical conducted correspondingly to the electrical connector 2 or to the mating connector 11 to transmit the corresponding signals, and are not hereinafter limited.

Figure 15:
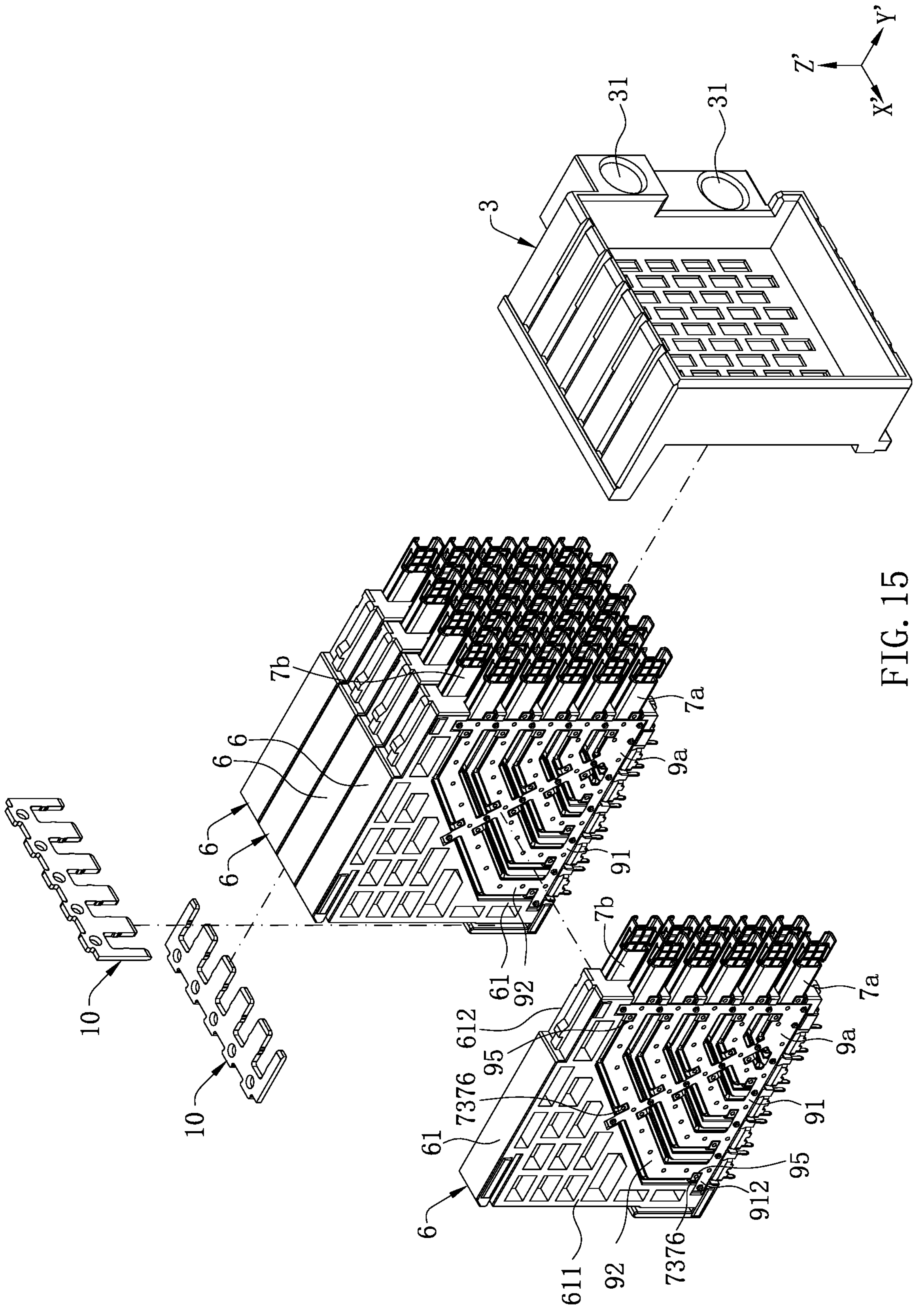
FIG. 15 is a perspective disassembled view of an electrical connector according to the second embodiment of the present invention.
Figure 16:
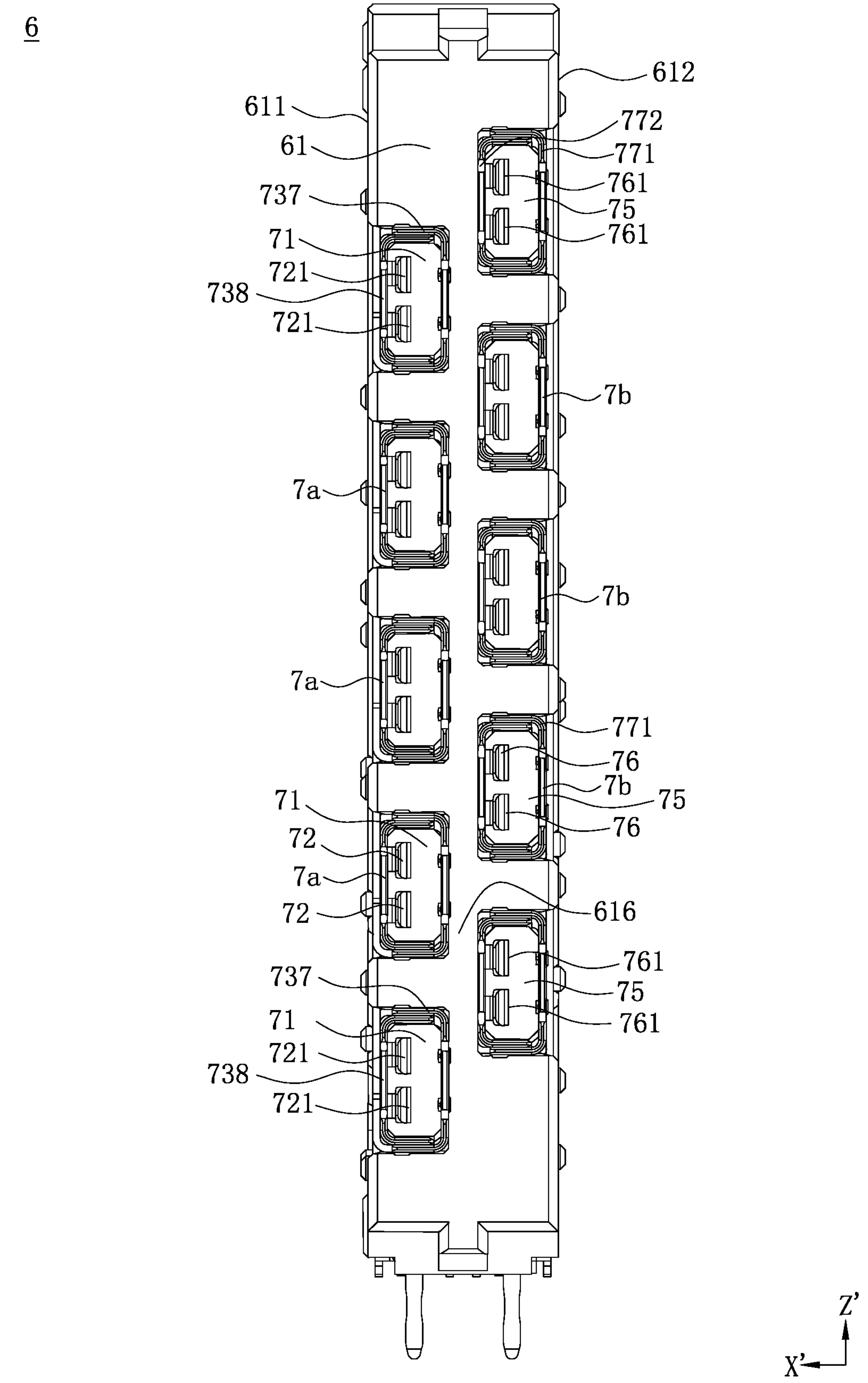
FIG. 16 is a plain view of an electrical module according to the second embodiment of the present invention.
Figure 17:
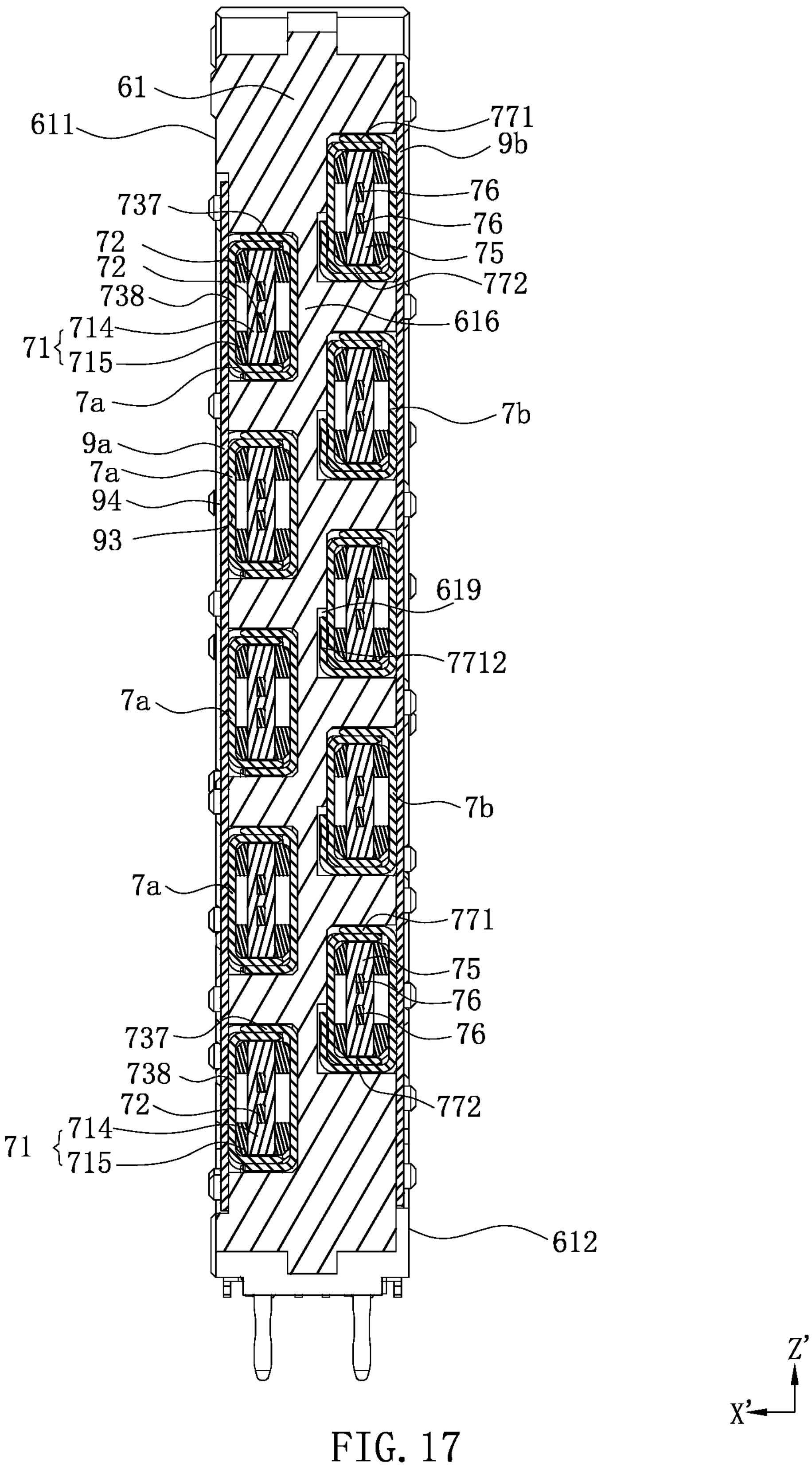
FIG. 17 is a sectional view of an electrical module according to the second embodiment of the present invention.

FIG. 15 shows the electrical connector 2 according to the second embodiment of the present invention, which is used to mate with the mating connector 11 along the third direction Y', and to be connected to the corresponding first electrical component. The electrical connector 2 includes a first insulating mating shell 3, a plurality of electrical modules 6 and two retaining sheets 10. The first insulating mating shell 3 further includes two guiding insertion holes 31. The electrical modules 6 are arranged in parallel along the first direction X' and are fixed to the first insulating mating shell 3, and the electrical modules 6 are fixed and positioned by the two retaining sheets 10.

Referring to FIG. 16, FIG. 18, FIG. 21 and FIG. 22, each electrical module 6 includes an insulating body 61, a plurality of first terminal assemblies **7*a*, a plurality of second terminal assemblies 7*b*, a first grounding member 9*a* and a second grounding member 9*b*. The first terminal assemblies 7*a* are fixed to the insulating body 61 and are arranged in a first row, and the second terminal assemblies 7*b* are fixed to the insulating body 61 and are arranged in a second row. The first row and the second row of the electrical module 6 use the second direction Z' as the row direction thereof. The insulating body 61 has a first side 611 and a second side 612 provided opposite to each other in the thickness direction thereof. A plurality of first accommodating slots 613 are concavely provided on the first side 611 of the insulating body 61 toward the second side 612, and are arranged along the row direction of the first row. Each first terminal assembly 7***a* is accommodated in a corresponding first accommodating slot 613. A plurality of second accommodating slots 617 are concavely provided on the second side 612 of the insulating body 61 toward the first side 611, and are arranged along the row direction of the second row. Each second terminal assembly 7*b* is accommodated in a corresponding second accommodating slot 617. The first grounding member 9*a* is laterally fixed to the insulating body 61 from the first side 611, and the second grounding member 9*b* is laterally fixed to the insulating body 61 from the second side 612. In the second embodiment, the first terminal assemblies 7*a* and the second terminal assemblies 7*b* are respectively assembled and accommodated in the insulating body 61 from the first side 611 and the second side 612 of the insulating body 61, such that a single insulating body 61 may fix two rows of the terminal assemblies. The first terminal assemblies 7*a* in the first row and the second terminal assemblies 7*b* in the second row are limited and stopped by a stopping wall 616 in the middle of the insulating body 61. Compared to the case where each insulating body 61 merely fixes the terminal assemblies in one corresponding row, in the second embodiment, the terminal assemblies in two rows may be respectively stopped by the two sides of the stopping wall 616 instead of using two stopping walls 616 of two insulating bodies 61 to respectively stop the terminal assemblies in the two rows. Thus, the embodiment of the present invention may reduce the thickness of a stopping wall 616, thereby reducing the production cost, and effectively reducing the size of the electrical connector 2 in the first direction X'. It should be noted that, in the second embodiment, the thickness directions of the electrical module 6, the insulating body 61, the first grounding member 9*a* and the second grounding member 9*b* are all in the first direction X'.

Referring to FIG. 16 to FIG. 20, each first terminal assembly 7*a* is accommodated in a corresponding first accommodating slot 613. The first grounding member 9*a* is embedded in the insulating body 61 from the first side 611 toward the second side 612. The first grounding member 9*a* has a first plate surface 93 and a second plate surface 94 provided opposite to each other along the thickness direction thereof. The first plate surface 93 is in contact with the first terminal assemblies 7*a* in the first row, and the second plate surface 94 does not pass beyond the first side 611 along a facing direction thereof. Since the first accommodating slots 613 are concavely provided on the first side 611, the first terminal assemblies 7*a* may be easily assembled and accommodated to the insulating body 61. Meanwhile, the first grounding member 9*a* is embedded in the insulating body 61, and the second plate surface 94 does not pass beyond the first side 611, thus preventing from the overlapping addition of the thickness of the first grounding member 9*a* and the thickness of the insulating body 61, reducing the thickness size of the electrical connector 2, and facilitating the miniaturization of the electrical connector 2. Similarly, each second terminal assembly 7*b* is accommodated in a corresponding second accommodating slot 617. The second grounding member 9*b* is embedded in the insulating body 61 from the second side 612 toward the first side 611. The second grounding member 9*b* has a third plate surface and a fourth plate surface provided opposite to each other along the thickness direction thereof. The third plate surface is in contact with the second terminal assemblies 7*b* in the second row, and the fourth plate surface does not pass beyond the second side 612 along a facing direction thereof. Thus, the second terminal assemblies 7*b* may be easily assembled and accommodated to the insulating body 61, and overlapping addition of the thickness of the second grounding member 9*b* and the thickness of the insulating body 61 may be prevented, thus reducing the thickness size of the electrical connector 2.

Figure 18:
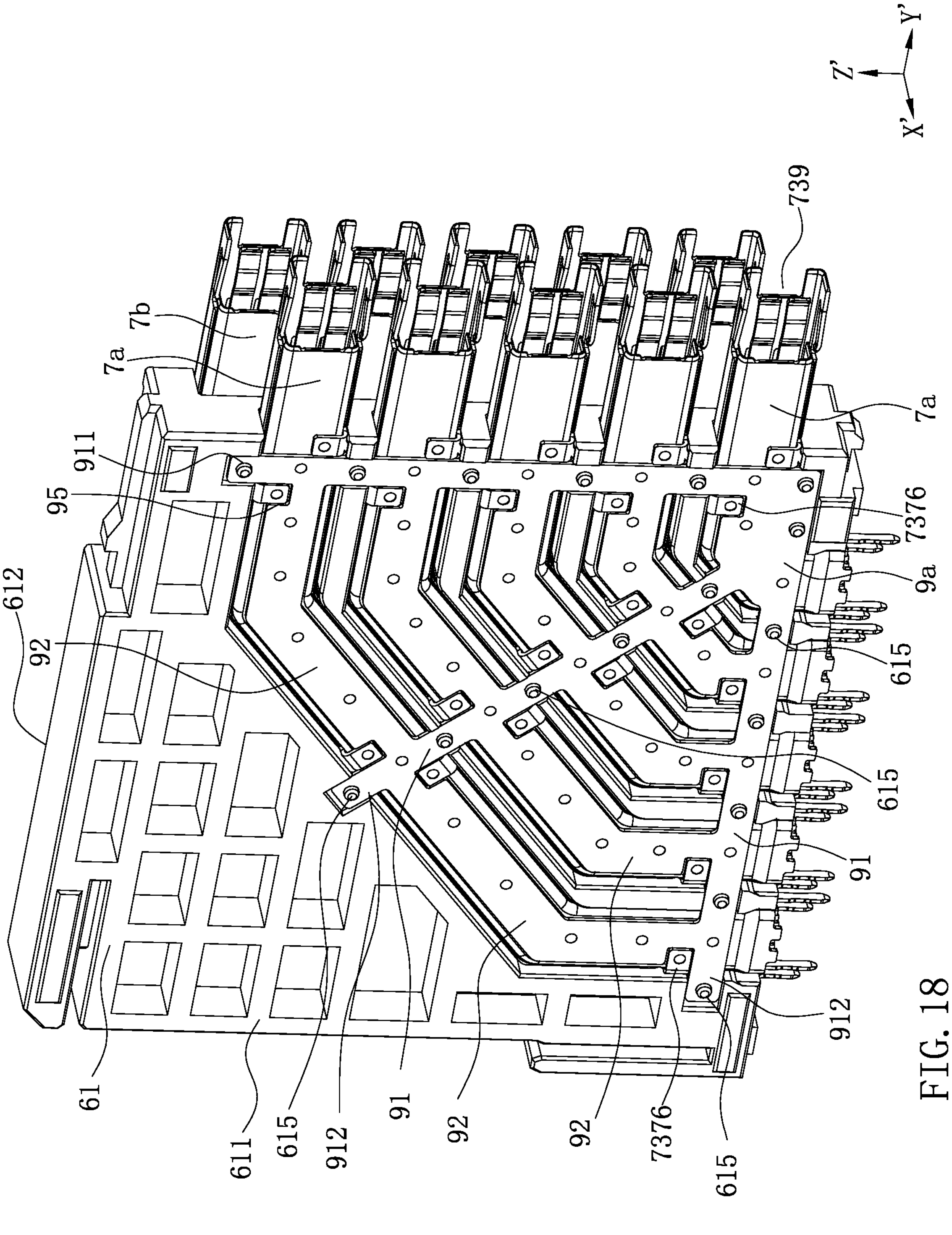
FIG. 18 is a perspective schematic view of an electrical module in a viewing angle according to the second embodiment of the present invention.
Figure 19:
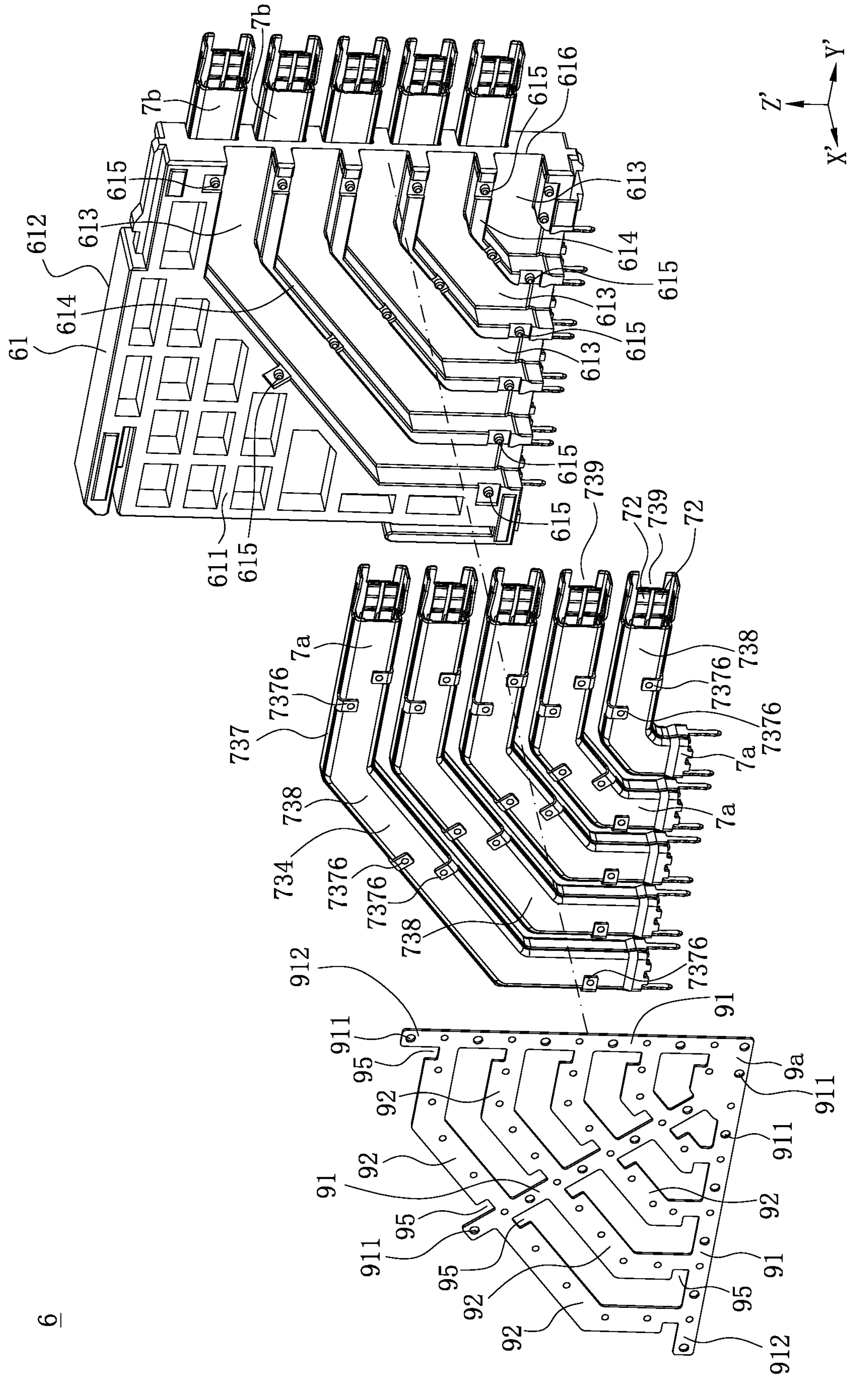
FIG. 19 is a partially disassembled schematic view of an electrical module according to the second embodiment of the present invention.
Figure 20:
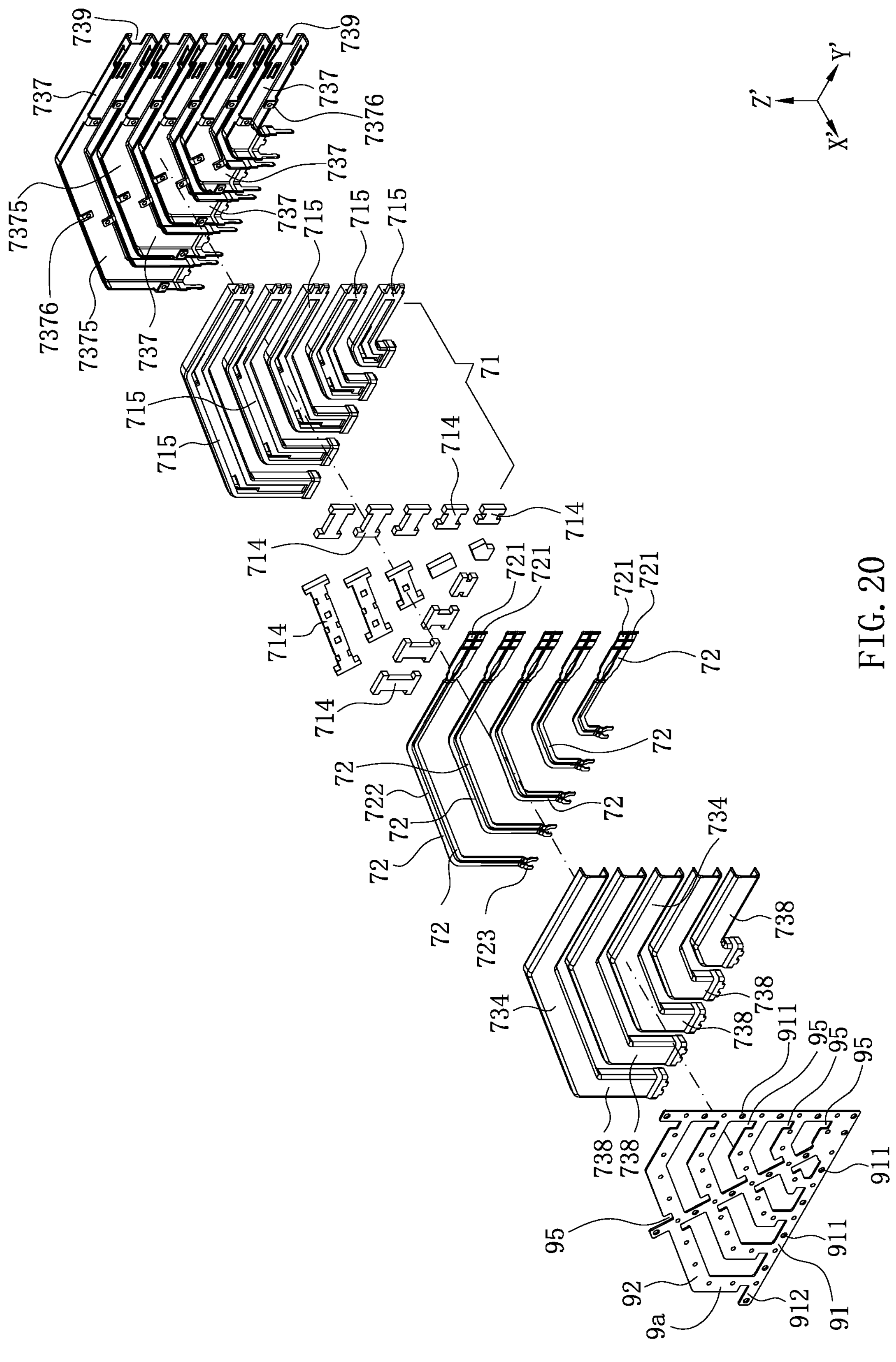
FIG. 20 is a disassembled schematic view of a first grounding member and a first row of first terminal assemblies according to the second embodiment of the present invention.

Referring to FIG. 18 to FIG. 20, each first terminal assembly 7*a* includes two first signal terminals 72, a first insulating block 72 fixing the two first signal terminals 72, and a first shielding shell 73. The first shielding shell 73 includes a first shielding member 737 and a second shielding member 738 in contact with each other. Specifically, the first shielding member 737 has a first main body portion 7375 and a plurality of first extending arms 7376 extending from the first main body portion 7375. An outer surface of the second shielding member 738 functions as the first shielding side surface 734 of the first shielding shell 73, and the first shielding side surface 734 is exposed to the first side 611. The insulating block 71 and the two first signal terminals 72 are located in the shielding space of the first shielding shell 73. The first extending arms 7376 are fixed to the first shielding side surface 734. The first grounding member 9*a* and the first shielding side surfaces 734 located in the first row are fixed to each other.

Each second terminal assembly 7*b* includes two second signal terminals 76, a second insulating block 75 fixing the two second signal terminals 76, and a second shielding shell 77. The second shielding shell 77 includes a third shielding member 771 and a fourth shielding member 772 in contact with each other. The third shielding member 771 has a second main body portion 7711 and a plurality of second extending arms 7712 extending from the second main body portion 7711. The fourth shielding member 772 has an inner shielding surface 7721 and an outer shielding surface 7722 provided opposite to each other along the thickness direction thereof. The inner shielding surface 7721 and the second main body portion 7711 are altogether surroundingly provided to form a shielding space of the second shielding shell 77. The second insulating block 75 and the two second signal terminals 76 are located in the shielding space of the second shielding shell 77. The second extending arms 7712 are fixed to the outer shielding surface 7722. The second grounding member 9*b* and the third shielding members 771 located in the second row are fixed to each other. It should be noted that, in the second embodiment, the first shielding member 737 and the second shielding member 738 are both U-shaped structures, and are assembled and surroundingly provided to form the first shielding shell 73. In other embodiments, the first shielding member 737 and the second shielding member 738 may be in other shapes. For example, the first shielding member 737 is a U-shaped structure and the second shielding member 738 is a flat plate structure, or the first shielding member 737 and the second shielding member 738 are both L-shaped structures. Similarly, the third shielding member 771 and the fourth shielding member 772 may be in other shapes, and are thus not hereinafter elaborated. It should be noted that, in the second embodiment, the first shielding member 737 has multiple first extending arms 7376, and the third shielding member 771 has multiple second extending arms 7712. In other embodiments, the first shielding member 737 may have only one first extending arm 7376, and the third shielding member 771 may have only one second extending arm 7712, as long as the first shielding member 737 may be fixed to the second shielding member 738, and the third shielding member 771 may be fixed to the fourth shielding member 772. Further, the first extending arms 7376 and the second extending arms 7712 may be respectively fixed to the first shielding side surface 734 and the outer shielding surface 7722 by soldering (such as point soldering), and may be respectively pressed and fixed to the first shielding side surface 734 and the outer shielding surface 7722, which is not hereinafter limited.

It should be noted that, in the second embodiment, the first insulating block 71 includes a first insert-molding member 714 and a second insert-molding member 715, where the first insert-molding member 714 is formed and covers the outer periphery of the two first signal terminals 72, and the second insert-molding member 715 is formed and covers the outer periphery of the first insert-molding member 714 and the two first signal terminals 72. During the insert-molding of the second insert-molding member 715, the first insert-molding member 714 provides a fixing location for the mold. Thus, after removing the mold, the first insulating block 71 may be prevented from leaving an unnecessary recess, thus preventing the portions of the first signal terminals 72 that are not to be exposed from being exposed in the air medium, and reducing the impedance wave of the first signal terminals 72. Similarly, the second insulating block 75 may be formed by forming of the insert-molding members twice. In other embodiments, the first insulating block 71 and the second insulating block 75 may be formed by a single insert-molding, which is not hereinafter limited.

Referring to FIG. 14 to FIG. 20, each first signal terminal 72 has a first contact portion 721, a first conductive portion 723, and a first connecting portion 722 connecting the first contact portion 721 and the first conductive portion 723. Each second signal terminal 76 has a second contact portion 761, a second conductive portion 763, and a second connecting portion 762 connecting the second contact portion 761 and the second conductive portion 763. The first contact portion 721 and the second contact portion 761 are used to mate with the mating connector 11. The first conductive portion 723 and the second conductive portion 763 are used to be electrically connected to the first electrical component. In the second embodiment, the first electrical component is the first base plate 16, and the first conductive portion 723 and the second conductive portion 763 are soldered to the surface of the first base plate 16 by solder balls, thus enhancing the coplanarity of the first conductive portion 723 and the second conductive portion 763 of the electrical connector 2. In other embodiments, the first conductive portion 723 and the second conductive portion 763 may be fish-eye shaped end portions (not shown) or insertion hole type conductive portions (not shown) to be inserted into the insertion holes (not shown) of the first base plate 16. It should be noted that, among the first terminal assemblies **7*a*, it is possible to select and configure the two first signal terminals 72 of some of the first terminal assemblies 7*a* to be arranged as differential pairs, and to select and configure some others of the first terminal assemblies 7*a* to have two power terminals for transmitting power or terminals for transmitting other signals, as long as the electrical connector 2 has some first terminal assemblies 7*a* that include two first signal terminals 72. Similarly, it is possible to select and configure the two second signal terminals 76 of some of the second terminal assemblies 7*b* to be arranged as differential pairs, and to select and configure some others of the second terminal assemblies 7*b* to have two power terminals for transmitting power or terminals for transmitting other signals, as long as the electrical connector 2 has some second terminal assemblies 7*b* that include two second signal terminals 76. Further, a portion of the first shielding member 737 is surroundingly provided around the first contact portions 721, and is concavely provided with a reserved slot 739. A contact surface of each first contact portion 721 faces toward the reserved slot 739. In other embodiments, a portion of the second shielding member 738 may be surroundingly provided around the first contact portions 721, and is concavely provided with the reserved slot 739. Correspondingly, a portion of the third shielding member 771 or a portion of the fourth shielding member 772 is surroundingly provided around the second contact portions 761, and is concavely provided with a reserved slot 739. The reserved slots 739 are used to reserve for some components of the mating connector 11**.

Referring to FIG. 18 to FIG. 20, the first grounding member **9*a* is provided with a plurality of reserved areas 95. The reserved areas 95 are reserved for the corresponding first extending arms 7376. The projections of the first grounding member 9*a* along the second direction or the third direction partially overlaps with the projections of the first extending arms 7376 located in the reserved areas 95 along the second direction or the third direction. Thus, by fixing each first extending arm 7376 to the first shielding side surface 734 of the corresponding second shielding member 738, the fixing of the first shielding member 737 and the second shielding member 738 may be facilitated, and there is no need to provide fixing holes on the first shielding member 737 and the second shielding member 738, thus reducing the interference to the first signal terminals 72 caused by the interference signals entering the first shielding shell 73 from the outer environment. Further, by the first grounding member 9*a*, the second shielding members 738 may be conductively connected to form a whole grounding shielding structure, such that the shielding effect of the electrical connector 2 is good. By providing the reserved areas 95, overlapping addition of the thicknesses of the first extending arm 7376 and the first grounding member 9*a* may be prevented, thereby reducing the thickness of the electrical connector 2. It should be noted that, in the second embodiment, each reserved area 95 is an area provided with an empty space by running through the first grounding member 9*a* along the thickness direction of the first grounding member 9*a*. In other embodiments, each reserved area 95 may be an area concavely provided on one side of the first grounding member 9*a* without running through the first grounding member 9*a*. For example, the thickness of the first grounding member 9*a* may be greater than the thickness of the first extending arm 7376, and each reserved area 95 is concavely provided from the surface of the first grounding member 9*a* corresponding to the thickness of the first extending arm 7376**.

Referring to FIG. 18 to FIG. 20, the first grounding member **9*a* has a plurality of first spokes 91 and a plurality of second spokes 92. The first spokes 91 are simultaneously in contact with the first shielding side surfaces 734 located in the first row, and each second spoke 92 is fixed to a corresponding first shielding side surface 734 located in the first row. Each second spoke 92 and the first spokes 91 are cross-connected. The second shielding members 738 are conductively connected by the first spokes 91, and the contact area of the first grounding member 9*a* and the second shielding members 738 is increased by the second spokes 92. The first shielding member 737 has a plurality of first extending arms 7376, and the first extending arms 7376 are formed by extending from different edges of the first main body portion 7375. The first extending arms 7376 are completely staggered along the extending length of the first main body portion 7375. Compared to the case where the first extending arms 7376 are not completely staggered, which results in the first extending arms 7376 at different sides are provided opposite to each other and facing each other directly, the second embodiment allows the first main body portion 7375 and the second shielding member 738 to be fixed through the staggered first extending arms 7376 in a greater length range, and the corresponding reserved area 95 are staggered, thereby preventing the reserved areas 95 from being provided opposite to each other and facing each other directly to result in the strength of certain locations of the first grounding member 9*a* to be reduced, such that the second embodiment may reduce the risk of breaking the first grounding member 9*a*. In the second embodiment, each reserved area 95 is provided to be in a recess shape. In other embodiments, the reserved areas 95 may be provided not to be in the recess shape. For example, each reserved area 95 shrinks inward from the side edge of each second spoke 92, such that the overall width of the second spokes 92 is reduced, thus forming the reserved areas 95 at the side edges of the second spokes 92. Alternatively, the reserved areas 95 may be holes with limited sizes provided on the plain surface of the first grounding member 9*a***.

Further, the first extending arms 7376 include two first extending arms 7376 provided adjacent to each other along the length direction of the first main body portion 7375, and the two first extending arms 7376 are respectively adjacent to the two side edges of the corresponding first spoke 91. The two first extending arms 7376 are formed by extending from different edges of the first main body portion 7375. Thus, the two first extending arms 7376 formed by extending from different edges are adjacent to the two side edges of each first spoke 91, allowing the two first extending arms 7376 to perform position limiting and stopping with the first grounding member **9*a* near the first spoke 91, better preventing displacement of the first spokes 91, increasing the stability between the first grounding member 9*a* and the second shielding members 738, preventing the first spokes 91 from detaching from the second shielding members 738 and affecting the conductive connection between the second shielding members 738, and ensuring the shielding effect of the electrical connector 2**.

Referring to FIG. 18 to FIG. 20, each reserved area 95 is a recess. One of the second spokes 92 is provided with two adjacent recesses, and the two recesses are located at two sides of a corresponding first spoke 91 and are limited by the corresponding first spoke 91 along the extending length of the second spokes 92. Each first spoke 91 is provided with a plurality of through holes 911 arranged along an extending direction thereof. The insulating body 61 is provided with a plurality of protruding portions 615, and each protruding portion 615 is fixed in a corresponding through hole 911. Compared to the case where each reserved area 95 is not provided as the recess, the embodiment may reduce the area of the reserved areas 95 of the first grounding member **9*a*, and increase the fixing area of the first grounding member 9*a* and the first shielding side surface 734. Further, by protruding the first extending arms 7376 into the recesses, the first grounding member 9*a* and the first extending arms 7376 may be better limited, particularly limiting the positions of the first spokes 91 to reduce the displacement of the first spokes 91. Moreover, by matching and fixing of the through holes 911 and the protruding portions 615, displacement of the first spokes 91 may be further prevented, thus increasing the position stability between the first grounding member 9*a*, the first shielding member 737, and the second shielding member 738. In the second embodiment, each first extending arm 7376 is provided to be adjacent to the corresponding first spoke 91 and is limited to the side edge of the corresponding first spoke 91 along the extending length of the second spokes 92. In other embodiments, it is possible that in all of the first extending arms 7376, some of the first extending arms 7376 are provided to be adjacent to the first spokes 91 and are limited to the side edges of the first spokes 91 along the extending length of the second spokes 92, without limiting all of the first extending arms 7376 in such configuration. By limiting the position of each first extending arm 7376 to the side edge of the corresponding first spoke 91, the risks of displacement to the first spokes 91 to affect the first grounding member 9*a* conducting the second shielding members 738 are reduced. In other embodiments, the first extending arms 7376 may be provided on the second spokes 92 and are not adjacent to the side edges of the corresponding first spokes 91**.

Referring to FIG. 18 to FIG. 20, each first spoke 91 has an extending section 912. The extending section 912 extends beyond a side edge of a corresponding second spoke 92 to form a free end. The extending section 912 is provided with a through hole 911, and a protruding portion 615 of the insulating body 61 is fixed in the through hole 911 of the extending section 912. The second embodiment allows the second spoke 92 that is the closest to the extending section 912 to be closer to the first shielding side surface 734, thus preventing the second spokes 92 from warping and not in contact with the corresponding first shielding side surface 734.

Figure 21:
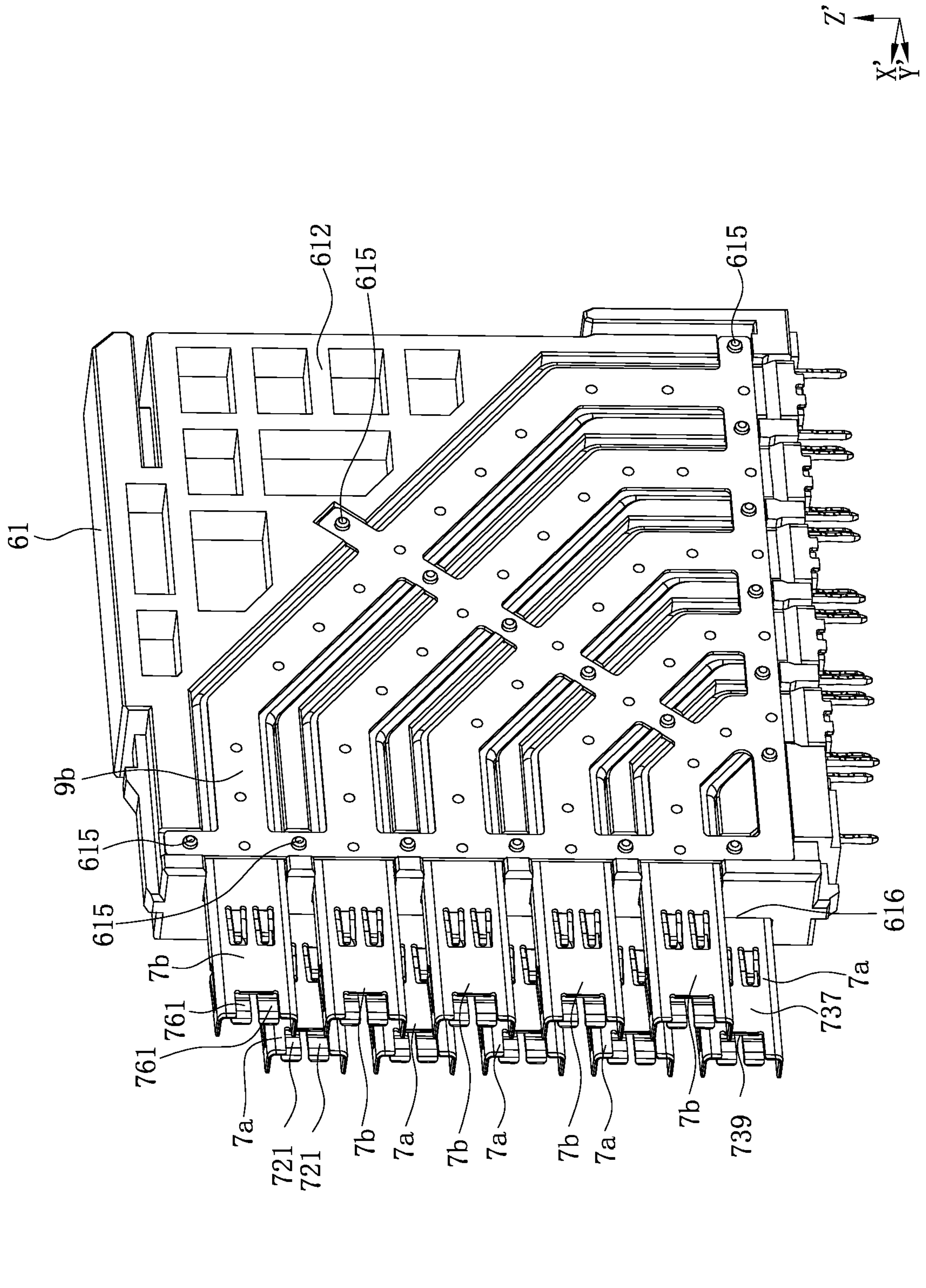
FIG. 21 is a perspective schematic view of an electrical module in another viewing angle according to the second embodiment of the present invention.
Figure 22:
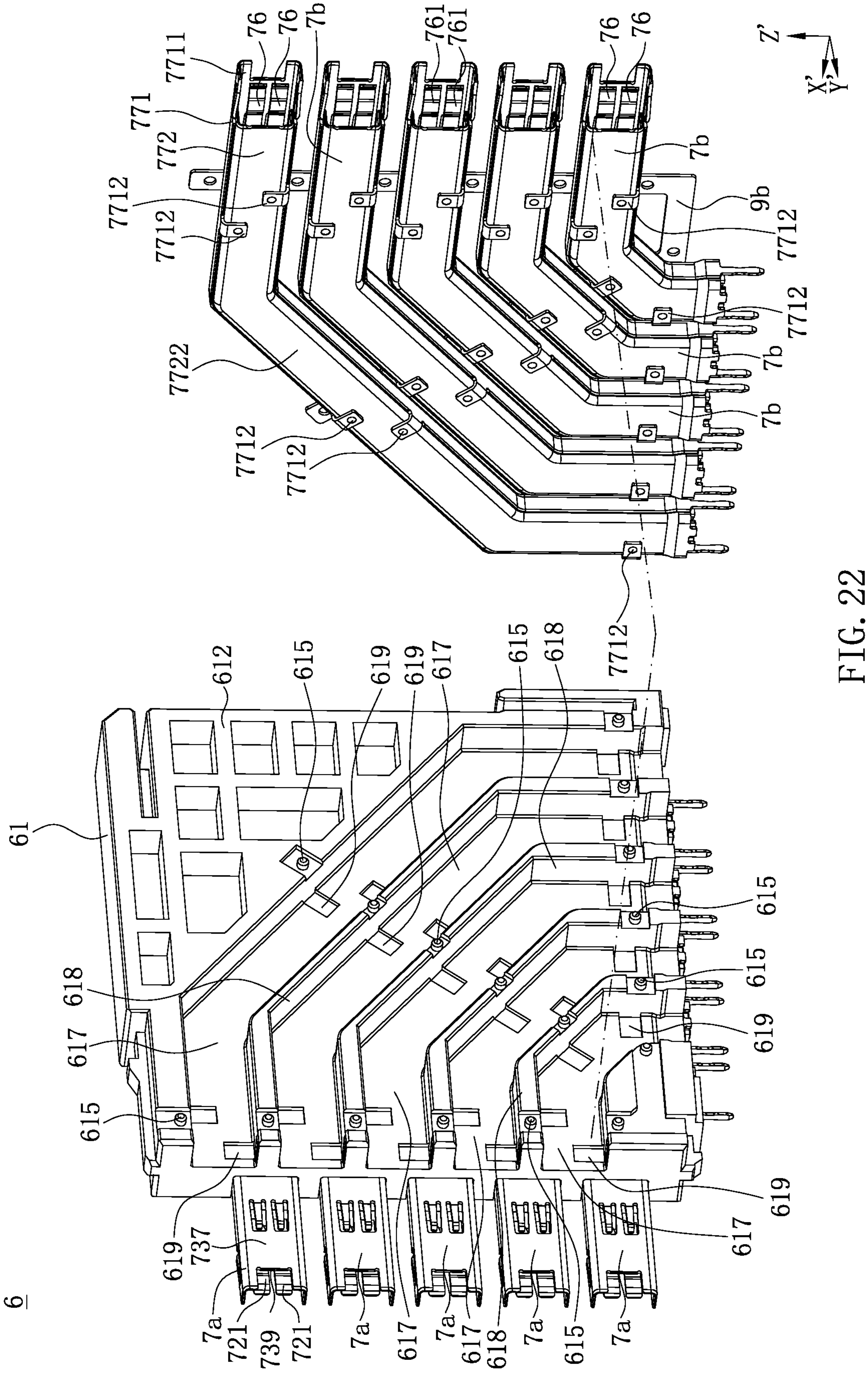
FIG. 22 is a partially disassembled schematic view of an electrical module according to the second embodiment of the present invention.
Figure 23:
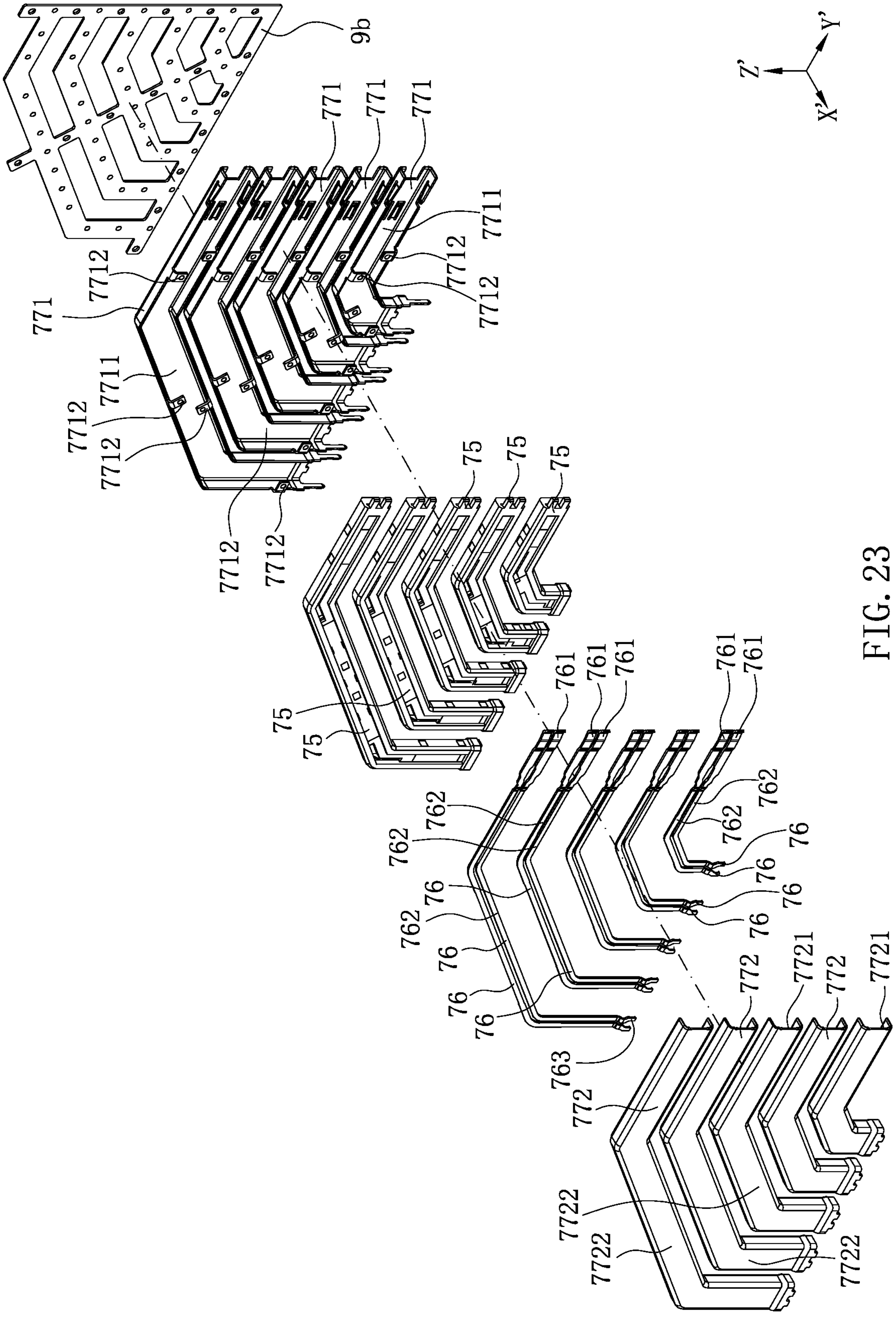
FIG. 23 is a disassembled schematic view of a second grounding member and a second row of second terminal assemblies according to the second embodiment of the present invention.

Referring to FIG. 21 to FIG. 23, in each second terminal assembly **7*b*, the third shielding member 771 has a second main body portion 7711 and a plurality of second extending arms 7712 extending from the second main body portion 7711. The fourth shielding member 772 has an inner shielding surface 7721 and an outer shielding surface 7722 provided opposite to each other along the thickness direction thereof. The inner shielding surface 7721 and the second main body portion 7711 are altogether surroundingly provided to form a shielding space of the second shielding shell 77. The second insulating block 75 and the two second signal terminals 76 are located in the shielding space of the second shielding shell 77. The second extending arms 7712 are fixed to the outer shielding surface 7722. The insulating body 61 is provided with a plurality of concave areas 619 corresponding to the second extending arms 7712, and each concave area 619 is reserved for a corresponding second extending arm 7712. By the concave areas 619 being reserved for the second extending arms 7712, the overlapping addition of the thickness of the insulating body 61 and the second extending arms 7712 may be reduced, further reducing the thickness size of the electrical connector 2, increasing the position stability of the fourth shielding member 772 and the insulating body 61, and reducing the risk of the fourth shielding member 772 detaching from the insulating body 61. Further, each first accommodating slot 613 accommodates a corresponding first terminal assembly 7*a*, and each second accommodating slot 617 accommodates a corresponding second terminal assembly 7*b*. Each concave area 619 is concavely formed on the wall surface of the corresponding second accommodating slot 617. A second partition portion 618 is provided between two adjacent second accommodating slots 617. The first terminal assemblies 7*a* and the second terminal assemblies 7*b* deviate from each other in the second direction Z', and the first partition portions 614 and the second partition portions 618 are completely staggered along the second direction Z'. Compared to the case where the first partition portions 614 and the second partition portions 618 are not staggered, such that the first accommodating slots 613 and the second accommodating slots 617 are provided to completely face each other directly along the thickness direction of the insulating body 61 and the first partition portions 614 and the second partition portions 618 are provided to completely face each other directly along the thickness direction of the insulating body 61, thus resulting in a large difference of the thickness distribution among locations of the insulating body 61, and the insulating body 61 may easily break at the first accommodating slots 613, the second embodiment allows the first accommodating slots 613 to directly face the second partition portions 618, and the second accommodating slots 617 to directly face the first partition portions 614, such that the difference of the material thickness distribution of the insulating body 61 is reduced, preventing the insulating body 61 from breaking at the first accommodating slots 613 or the second accommodating slots 618, preventing the material thickness of the insulating body 61 from being non-uniform to result in non-uniform heat dissipation, and reducing the risks of deformation of the insulating body 61 during forming due to non-uniform heat dissipation. Further, in the second embodiment, the first signal terminals 72 in the first row form a plurality of terminal pairs, and the second signal terminals 76 in the second row form a plurality of terminal pairs, and the terminal pairs in the first row and the terminal pairs in the second row are staggered in the second direction Z'. In other words, when viewing from the first side 611 of the insulating body 61** toward the second side, the projections of the terminal pairs in the first row and the projections of the terminal pairs in the second row do not overlap, thus reducing the signal interference between the terminal pairs in the two rows.

Figure 24:
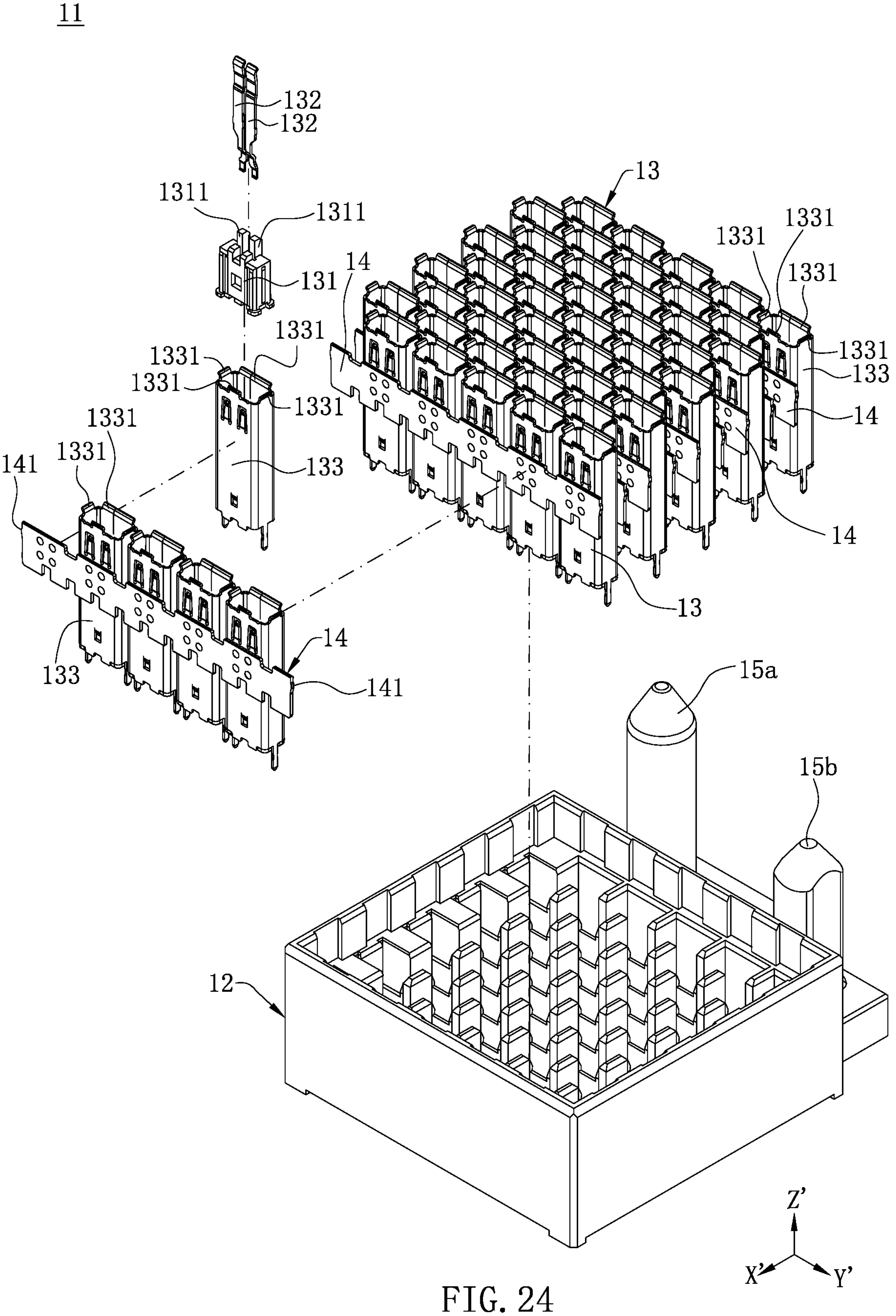
FIG. 24 is a disassembled schematic view of a mating connector according to the second embodiment of the present invention.
Figure 25:
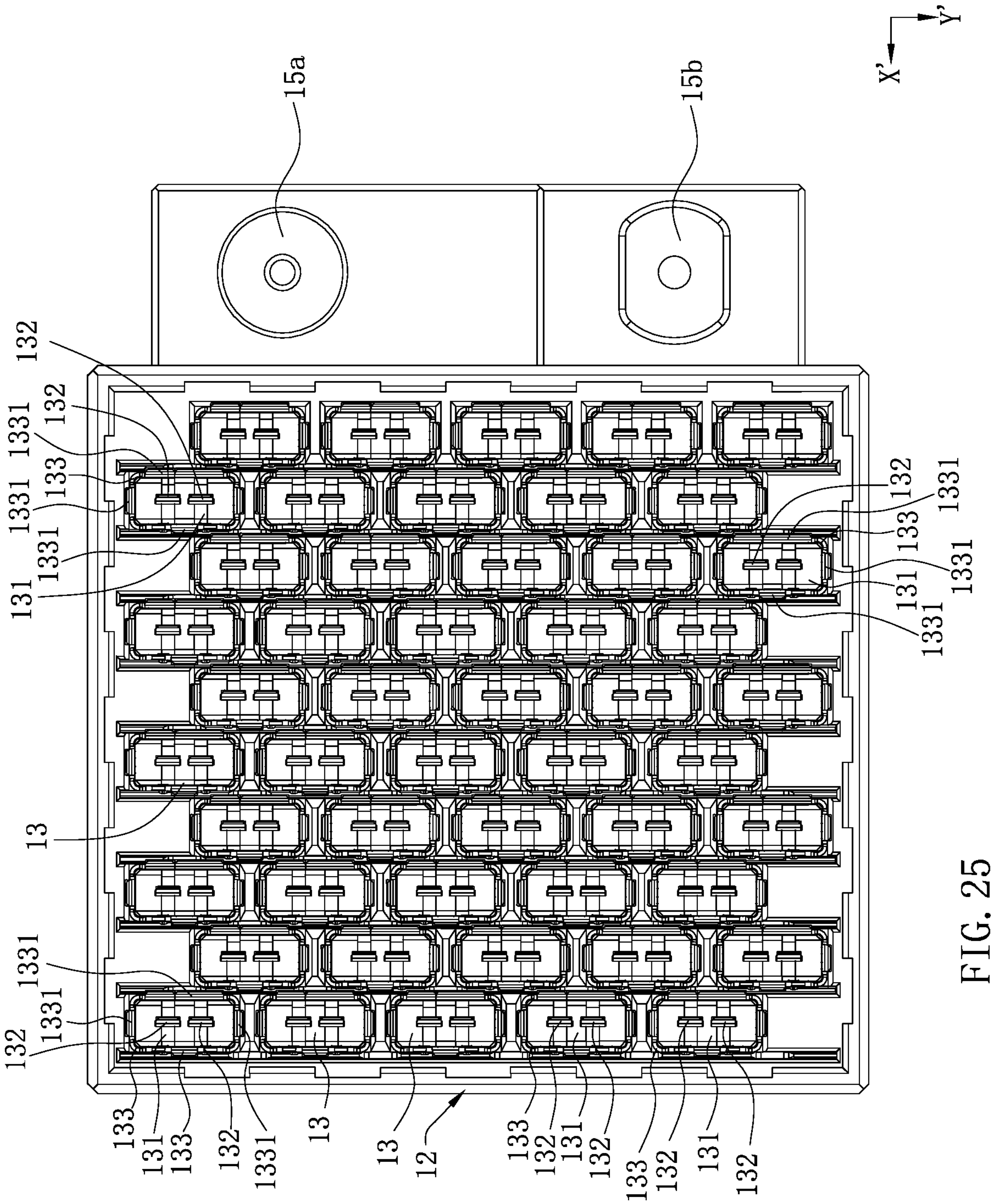
FIG. 25 is a plain view of the mating connector according to the second embodiment of the present invention.

Referring to FIG. 24 to FIG. 25, the mating connector 11 includes a second insulating mating shell 12, a plurality of mating terminal assemblies 13, a plurality of grounding bars 14 and two guiding posts. The mating terminal assemblies 13 are fixed to the second insulating mating shell 12 and are arranged in a plurality of rows. The mating terminal assemblies 13 in each row are altogether in contact with a corresponding grounding bar 14. The two guiding posts are fixed to the second insulating mating shell 12, and each guiding post is used to be inserted into a guiding insertion hole 31. Each of two sides of each grounding bar 14 is provided with an interfering portion 141, and the grounding bar 14 and the second insulating mating shell 12 are matched with interference by the interfering portions 141. When the mating of the electrical connector 2 and the mating connector 11 is complete, the second insulating mating shell 12 is mated with the first insulating mating shell 3, each mating terminal assembly 13 is mated with a corresponding first terminal assembly **7*a* or a corresponding second terminal assembly 7*b*, and the two guiding posts are respectively inserted in and fixed to the two guiding insertion holes 31**.

Specifically, the two guiding posts include a first guiding post **15*a* and a second guiding post 15*b*. A length of the first guiding post 15*a* is greater than a length of the second guiding post 15*b*. In the mating process of the electrical connector 2 and the mating connector 11, the first guiding post 15*a* is firstly matched with the corresponding guiding insertion hole 31 to perform an initial guided positioning, and then the second guiding post 15*b* is matched with the corresponding guiding insertion hole 31 to perform an accurate positioning. Since the first guiding post 15*a* is used to perform the initial positioning for the electrical connector 2 and the mating connector 11, the first guiding post 15*a* has a larger damaging risk, such as being broken or deforming. The second guiding post 15*b* is used to perform the further positioning on the premise that the first guiding post 15*a* has performed the initial positioning, and the second guiding post 15*b* has a lower damaging risk relative to the first guiding post 15*a*. Thus, in the second embodiment, the material strength of the first guiding post 15*a* is greater than the material strength of the second guiding post 15*b*. For example, the first guiding post 15*a* is made of a metal material, and the second guiding post 15*b* is made of a plastic material. Thus, on the premise that the two guiding posts are ensured not to be easily damaged, the production cost of the second guiding post 15*b*** may be reduced.

Figure 26:
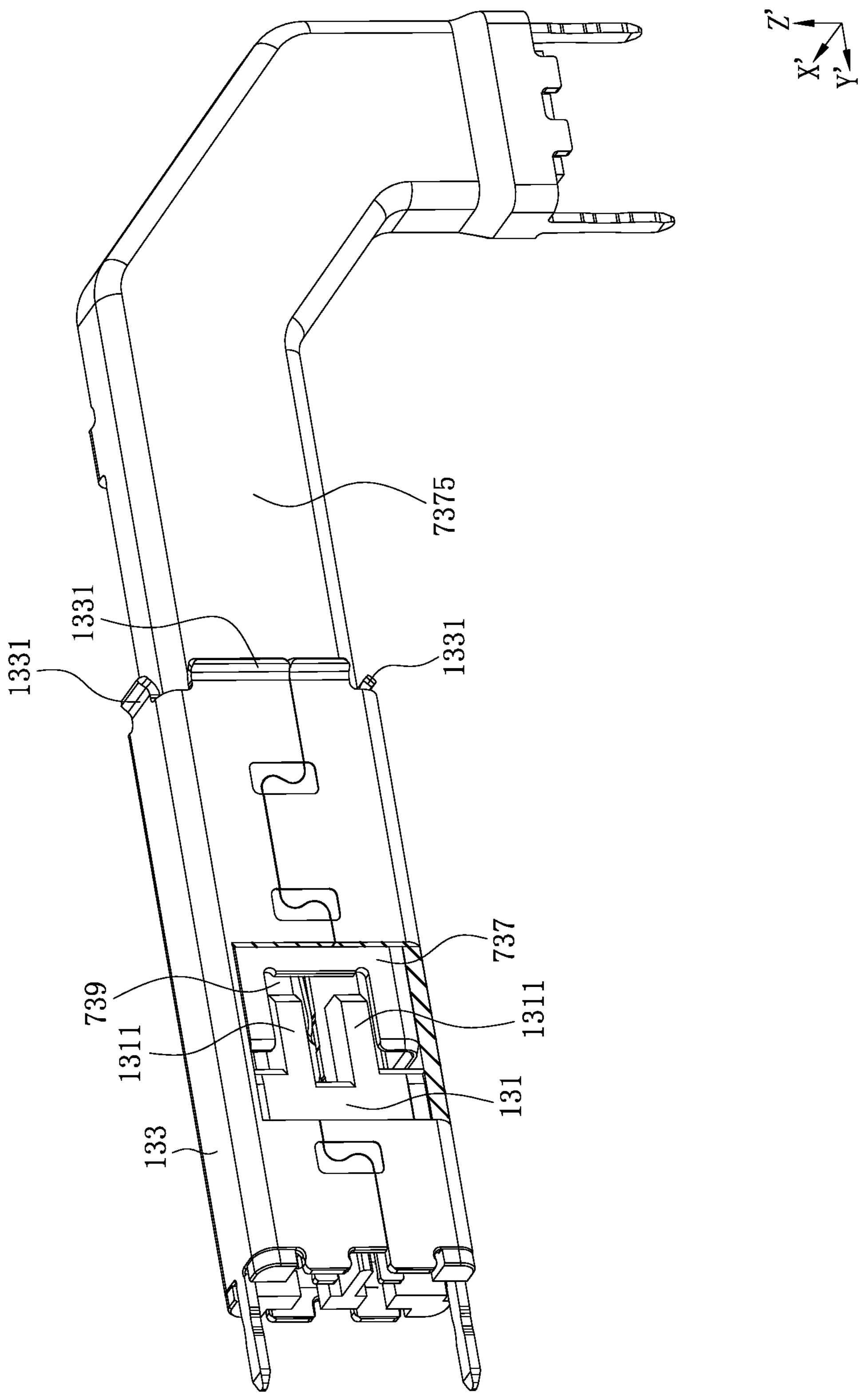
FIG. 26 is a partially perspective sectional view of the first terminal assemblies and mating assemblies after completion of mating according to the second embodiment of the present invention.
Figure 27:
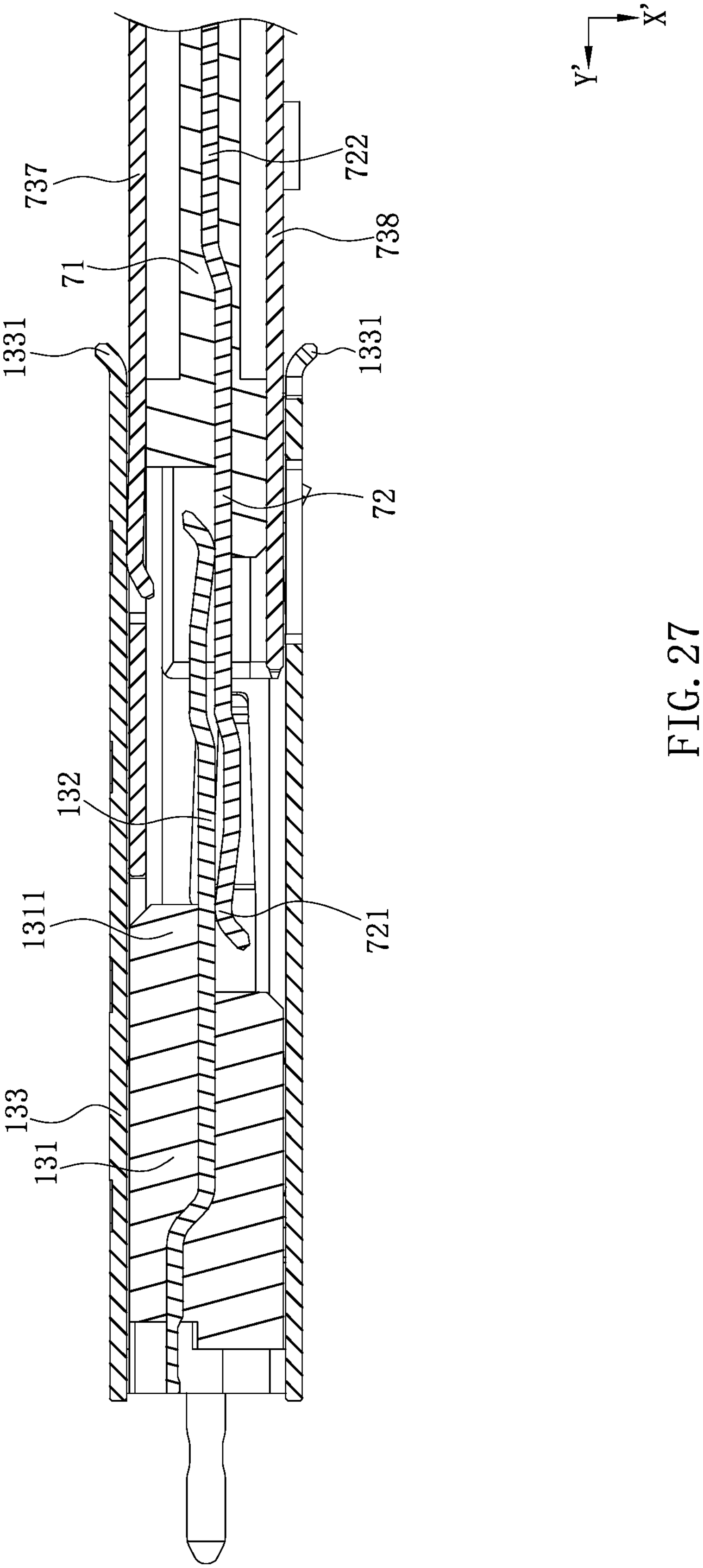
FIG. 27 is a partially disassembled plain view of the first terminal assemblies and the mating assemblies after completion of mating according to the second embodiment of the present invention.

Referring to FIG. 24 to FIG. 25, each mating terminal assembly 13 includes an insulating covering body 131, two mating terminals 132 fixed to the insulating covering body 131, and a mating shielding shell 133. The two mating terminals 132 are arranged to form a terminal pair. The mating shielding shell 133 covers outside the insulating covering body 131 and the two mating terminals 132. Corresponding to the electrical connector 2, the mating terminal assemblies 13 of the mating connector 11 are correspondingly arranged in a plurality of rows, and the mating shielding shells 133 of the mating terminal assemblies 13 in each row are in contact with a corresponding grounding bar 14. The mating terminals 132 in two adjacent rows are staggered in the row direction, thus reducing the signal interference between the mating terminals 132 in the two adjacent rows. In the second embodiment, when the mating of the electrical connector 2 and the mating connector 11 is complete, each mating terminal 132 is mated with a corresponding first signal terminal 72 or a corresponding second signal terminal 76. The first shielding member 737 and the second shielding member 738 are assembled and are mated to the corresponding mating shielding shell 133, and the first shielding member 737 and the second shielding member 738 are accommodated in the corresponding mating shielding shell 133. The third shielding member 771 and the fourth shielding member 772 are assembled and are mated to the corresponding mating shielding shell 133, and the third shielding member 771 and the fourth shielding member 772 are accommodated in the corresponding mating shielding shell 133. The mating edge of the mating shielding shell 133 is provided with a guiding portion 1331 being flipped outward to provide the guiding function. In other embodiments, the mating shielding shell 133 may be accommodated in the first shielding shell 73 or the second shielding shell 77. Further, as shown in FIG. 26 to FIG. 27, the insulating covering body 131 further includes two supporting portions 1311. The supporting portions 1311 are used to support the contact portions of the mating terminals 132, thus providing supporting forces to the contact portions of the mating terminals 132, such that the mating terminals 132 may be in stable contact with the first signal terminals 72 or the second signal terminals 76, reducing the elastic fatigue of the contact portions of the mating terminals 132. The contact surface of the first contact portion 721 faces the corresponding reserved slot 739. The reserved slot 739 is used to reserve for the corresponding supporting portion 1311. That is, when the mating of the electrical connector 2 and the mating connector 11 is complete, the supporting portions 1311 are located in the reserved slots 739. Thus, by the reserved slots 739, the supporting portions 1311 may be reserved without the need to enlarge the sizes of the first shielding member 737 or the second shielding member 738, thus preventing the supporting portions 1311 from colliding with the first shielding member 737 or the second shielding member 738, and reducing the volume of the electrical connector 2. In the second embodiment, the insulating covering body 131 is provided with two supporting portions 1311 corresponding to the two mating terminals 132. In other embodiments, the insulating covering body 131 may be provided with one supporting portion 1311, and the supporting portion 1311 simultaneously support the contact portions of the two mating terminals 132.

In sum, the electrical connector according to certain embodiments of the present invention has the following beneficial effects:

1. In certain embodiments of the present invention, the first terminal assemblies 7 are accommodated in the first accommodating slots 613 of the insulating body 61, such that the insulating body 61 and the first terminal assemblies 7 may be conveniently assembled and detached, thereby allowing assembling or repairing and replacing any damaged first terminal assemblies 7. The first shielding shell 73 of each first terminal assembly 7 covers a corresponding pair of the first signal terminals 72, thus reducing the signal crosstalk between two adjacent pairs of the first signal terminals 72. The first grounding member allows the first shielding shells 73 of the same electrical module 6 to be conductively connected by each first spoke, such that the first shielding shells 73 of the same electrical module 6 have the same electrical potential, thus improving the shielding effect of the first shielding shells 73 of the same electrical module 6, and enhancing the high frequency characteristics of the electrical connector 2. The plate surface 922 of each second spoke 92 of the first grounding member **9*a* extends along the first shielding side surface 734 of the corresponding first shielding shell 73 and is in contact with the corresponding first shielding side surface 734, thus increasing the contact area of the first shielding shells 73 and the first grounding member 9*a*, ensuring the electrical conductive connection between the first shielding shells 73 and the first grounding member 9*a*, and enhancing the high frequency characteristics of the electrical connector 2. Meanwhile, the second spokes 92 may further stop the first shielding shells 73 along the first direction X, thus preventing the first shielding shells 73 from excessive displacement along the first direction X or even detaching from the first accommodating slots 613. Further, the first grounding member 9*a* increases transmission paths for the grounding of the first shielding shells 73, allowing the noise signals to be conducted out of the electrical connector 2 more quickly. Compared to the case where the first grounding member 9*a* is only provided with a plurality of first spokes 91, in certain embodiments of the present invention, a side edge 921 of each second spoke 92 of the first grounding member 9*a* and at least one of the first spokes 91 are cross-connected, such that the structure of the first grounding member 9*a* is stable, and the first spokes 91** do not easily deform.
2. Each first spoke 91 is in contact to the insertion portions 736 of the corresponding first shielding shell 73, thus increasing the contact area of the first shielding shells 73 and the first grounding member **9*a*, ensuring the electrical conductive connection between the first shielding shells 73 and the first grounding member 9*a*, and enhancing the high frequency characteristics of the electrical connector 2. Meanwhile, the first spokes 91 shield the insertion portions 736 along the first direction X, thus preventing the insertion portions 736** from being exposed and deformed such as bending or warping.
3. Since the second shielding side surface 735 of the first shielding shell 73 is limited by the side wall surface 6133 of the corresponding first accommodating slot 613 along the first direction X, the first spokes 91 of the first grounding member **9*a* and the protruding portions 615 of the insulating body 61 are fixed to each other through the through holes 911 to limit the position of the first shielding side surface 734 of the first shielding shell 73, such that each first shielding shell 73 is clamped between the side wall surface 6133 of the corresponding first accommodating slot 613 and the first grounding member 9*a*, and the first shielding shells 73, the first grounding member 9*a* and the insulating body 61 form a stable overall structure, further enhancing the structural stability of the electrical connector 2, preventing the mating of the electrical connector 2 and the mating connector 11 from being affected due to the unstable structure of the electrical connector 2, and ensuring the normal usage of the electrical connector 2**.
4. The first shielding shell 73 is formed by the two U-shaped structures of the first shielding member 737 and the second shielding member 738, allowing the pair of the first signal terminals 72 being covered by the first insulating block 71 to be easily assembled into the first shielding shell 73. Further, the plate surface 922 of each second spoke 92 shields a portion of the fixing mechanisms 8, thus shielding the gaps existing in the locations of the fixing mechanisms 8, reducing signal leakages, and enhancing the high frequency characteristics of the electrical connector 2.
5. The first notch 741 prevents the bending section 74 of the first shielding member 737 from forming wrinkles, and the second notch 742 prevents the bending section 74 of the second shielding member 738 from pulling and tearing, thus facilitating the bending and forming of the first shielding member 737 and the second shielding member 738. Further, the second notch 742 is covered by the bending section 74 of the first shielding member 737, and the first notch 741 and the second notch 742 are not in communication, thus preventing the first shielding shell 73 to generate gaps at the bending sections 74, such that the bending sections 74 may surround the first signal terminals 72, thereby reducing the interference between the two pairs of the first signal terminals 72, and enhancing the high frequency characteristics of the electrical connector 2.
6. When fixing of the first shielding member 737 and the second shielding member 738 is complete, each pair of the contact protruding points 7371 of the first shielding member 737 functions to clamp the second shielding member 738, thus better fixing the first shielding member 737 and the second shielding member 738. Meanwhile, by the contact protruding points 7371, the contact locations between the first shielding member 737 and the second shielding member 738 are increased, thus ensuring the first shielding member 737 and the second shielding member 738 to be conductively connected.
7. By providing the width W2 to be greater than the width W1, the contact area between each first signal terminal 72 and the corresponding mating terminal 132 is increased, and the overall width of each first signal terminal 72 is prevented from being excessively large to increase the overall structure of the electrical module 6, thus facilitating the light and thin design of the electrical connector 2. Further, the exposure slot 713 can reduce the difference of the insertion loss between the first contact portion 721 and the first connecting portion 722 of the first signal terminal 72.

8. By the first extending arms 7376, the fixing of the first shielding member 737 and the second shielding member 738 may be facilitated, thus reducing the interference to the first signal terminals 72 caused by the interference signals entering the first shielding shell 73 from the outer environment. By providing the reserved areas 95, overlapping addition of the thicknesses of the first extending arm 7376 and the first grounding member 9*a* may be prevented, thereby reducing the thickness of the electrical connector 2.
9. By limiting the position of each first extending arm 7376 to the side edge of the corresponding first spoke 91, the risks of displacement to the first spokes 91 to affect the first grounding member 9*a* conducting the second shielding members 738 are reduced.
10. By providing the extending section 912, the second spokes 92 may be prevented from warping and not in contact with the corresponding first shielding side surface 734.
11. By the concave areas 619 being reserved for the second extending arms 7712, the overlapping addition of the thickness of the insulating body 61 and the second extending arms 7712 may be reduced, further reducing the thickness size of the electrical connector 2, increasing the position stability of the fourth shielding member 772 and the insulating body 61, and reducing the risk of the fourth shielding member 772 detaching from the insulating body 61.
12. By the reserved slots 739, the supporting portions 1311 may be reserved without the need to enlarge the sizes of the first shielding member 737 or the second shielding member 738, thus preventing the supporting portions 1311 from colliding with the first shielding member 737 or the second shielding member 738, and reducing the volume of the electrical connector 2.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising at least one electrical module, wherein the electrical module comprises:

an insulating body, having a first side and a second side opposite to each other in a first direction, wherein a plurality of first accommodating slots are concavely provided on the first side of the insulating body toward the second side and are arranged along a second direction perpendicular to the first direction;

a plurality of first terminal assemblies, respectively accommodated in corresponding ones of the first accommodating slots, and formed by a plurality of first insulating blocks, a plurality of first signal terminals and a plurality of first shielding shells, wherein each of the first terminal assemblies comprises a corresponding first insulating block of the first insulating blocks, a corresponding pair of first signal terminals of the first signal terminals fixed to the corresponding first insulating block, and a corresponding first shielding shell of the first shielding shells covering the corresponding first insulating block and the corresponding pair of first signal terminals, and wherein each of the first shielding shells has a first shielding side surface exposed to the first side; and a first grounding member, in mechanical contact with and fixed to the first shielding shells of the first terminal assemblies, and shielding an outer side of the first shielding side surface of each of the first shielding shells and adjacent to the first side, wherein the first grounding member has a plurality of first spokes and a plurality of second spokes, each of the first spokes corresponds to the first shielding shells of a same one of the at least one electrical module, the second spokes one-to-one correspond to the first shielding shells, a side edge of each of the second spokes and at least one of the first spokes are cross-connected, and a plate surface of each of the second spokes extends along the first shielding side surface of a corresponding first shielding shell of the first shielding shells and is in contact with the first shielding side surface of the corresponding first shielding shell.

2. The electrical connector according to claim 1, wherein the insulating body has a plurality of first partition portions, the first partition portions and the first accommodating slots are alternately provided on the insulating body along the second direction, one of the first partition portions is provided between each two adjacent ones of the first accommodating slots to separate two adjacent ones of the first shielding shells of the first terminal assemblies, one of each of the first shielding shells and a corresponding adjacent one of the first partition portions is protrudingly provided with at least one insertion portion, and the other of each of the first shielding shells and the corresponding adjacent one of the first partition portions is concavely provided with at least one first fixing slot to match and fix with the at least one insertion portion.

3. The electrical connector according to claim 2, wherein the first shielding side surface of each of the first shielding shells is provided with the at least one insertion portion along an extending direction of at least one of the first spokes, the corresponding adjacent one of the first partition portions is provided with the at least one first fixing slot, the insertion portions of the first shielding shells of the first terminal assemblies of the same one of the at least one electrical module are arranged along the extending direction of the at least one of the first spokes and are exposed to the first side of the insulating body, and a plate surface of at least one of the first spokes shields and is in contact with the corresponding insertion portions along the first direction.

4. The electrical connector according to claim 1, wherein the insulating body has a plurality of first partition portions, one of the first partition portions is provided between each two adjacent ones of the first accommodating slots, each of the first partition portions is respectively provided with a plurality of fixing recesses corresponding to the first spokes, each of the fixing recesses penetrates through a corresponding one of the first partition portions along an extending direction of a corresponding one of the first spokes, each of the first spokes is accommodated in the fixing recesses arranged in the extending direction thereof, and each of the second spokes is accommodated in a corresponding one of the first accommodating slots.

5. The electrical connector according to claim 4, wherein each of the first shielding shells has a second shielding side surface opposite to the first shielding side surface, the second shielding side surface of each of the first shielding shells is limited by a side wall surface of a corresponding one of the first accommodating slots along the first direction, a corresponding one of a plurality of protruding portions is protrudingly provided on a slot wall surface of each of the fixing recesses toward the first side of the insulating body, and each of the first spokes is provided with a plurality of through holes to respectively match and fix with the protruding portions.

6. The electrical connector according to claim 1, wherein each of the first shielding shells comprises a first shielding member and a second shielding member, a side surface of the first shielding member and a side surface of the second shielding member are fixed to each other by a plurality of fixing mechanisms, and the plate surface of each of the second spokes shields at least one of the fixing mechanisms in the first direction.

7. The electrical connector according to claim 6, wherein in the same one of the first terminal assemblies, the first shielding member and the second shielding member are two U-shaped structures provided opposite to each other, two opposite side surfaces of the first shielding member cover and are fixed to two opposite outer side surfaces of the second shielding member, each of the first signal terminals, the first shielding member and the second shielding member is provided with a bending section at a same location, an edge of the bending section of the first shielding member is concavely provided with a first notch, an edge of the bending section of the second shielding member is concavely provided with a second notch, the second notch is covered by the bending section of the first shielding member, and the first notch is located at an outer side of a side surface of the bending section of the second shielding member and is not communicated with the second notch.

8. The electrical connector according to claim 7, wherein the first shielding member has a plurality of pairs of contact protruding points, two contact protruding points of each pair of the pairs of contact protruding points are provided on the two opposite side surfaces of the first shielding member and are protruding toward each other, a distance between the two contact protruding points of each pair of the pairs of contact protruding points in the first direction is defined as a first distance, a distance between the two opposite outer side surfaces of the second shielding member in the first direction is defined as a second distance, when the first shielding member is not matched and fixed with the corresponding second shielding member, the first distance is less than the second distance; and when the first shielding member is fixed with the second shielding member, the two contact protruding points of each pair of the pairs contact protruding points are respectively in contact with the two opposite outer side surfaces of the second shielding member, and the first distance is equal to the second distance.

9. The electrical connector according to claim 1, wherein each pair of the first signal terminals is arranged in parallel along the first direction, each of the first signal terminals has a first contact portion, a first conductive portion and a first connecting portion located between the first contact portion and the first conductive portion, a third direction is defined to be perpendicular to the first direction and the second direction, the first contact portion extends from one end of the first connecting portion along the third direction and is configured to be in contact with a mating terminal of a mating connector in the second direction, each of the first shielding shells has a main body portion accommodated in a corresponding one of the first accommodating slots and an enlarged portion extending from one end of the main body portion along the third direction, the enlarged portion surrounds the first contact portions of the corresponding pair of first signal terminals, a distance between two shielding surfaces of the enlarged portion opposite to each other in the second direction is defined as a third distance, a distance between two shielding surfaces of the main body portion opposite to each other in the second direction is defined as a fourth distance, and the third distance is greater than the fourth distance.

10. The electrical connector according to claim 1, wherein each of the first signal terminals of each of the first terminal assemblies has a first contact portion, a first conductive portion and a first connecting portion located between the first contact portion and the first conductive portion, the first insulating block covers the first connecting portions of the corresponding pair of the first signal terminals, the first insulating block has a first insulating surface and a second insulating surface provided opposite to each other in the second direction, the first insulating surface of the first insulating block is concavely provided with an exposure slot toward the second insulating surface, the exposure slot extends along a length direction of the first connecting portion, a portion of the first connecting portion protrudes and enter the exposure slot along the first direction, another portion of the first connecting portion is embedded in the first insulating block, and for each of the first signal terminals, a width of the first connecting portion along the first direction is less than a width of the first contact portion along the first direction.

11. The electrical connector according to claim 10, comprising a plurality of electrical modules arranged in parallel along the first direction, wherein the two first signal terminals of each of the first terminal assemblies located in a same one of the electrical modules are arranged in parallel along the first direction, each of the first conductive portions of the two first signal terminals protrudes out of the first insulating block along the second direction to be soldered to a base plate, each pair of the first conductive portions is covered by the corresponding one of the first shielding shells, a third direction is defined to be perpendicular to the first direction and the second direction, the first conductive portions of the pairs of the first signal terminals located in the same one of the electrical modules are arranged along the third direction, and a thickness of the first conductive portion along the third direction is less than a thickness of the first connecting portion along the third direction.

12. The electrical connector according to claim 1, wherein:

each of the first shielding shells comprises a first shielding member and a second shielding member in contact with each other, the first shielding member is provided with a first main body portion and at least one first extending arm extending from the first main body portion, the first shielding side surface is provided on the second shielding member, and the first extending arm is fixed to the first shielding side surface; and the first grounding member is provided with at least one reserved area, the reserved area provides a reserved space for a corresponding one of the first extending arm, and a projection of the first grounding member along the second direction partially overlaps with a projection of the first extending arm located in the reserved area along the second direction.

13. The electrical connector according to claim 12, wherein the first shielding member has two first extending arms along a length direction of the first main body portion, the two first extending arms are respectively adjacent to two side edges of a corresponding one of the first spokes, and the two first extending arms are formed by extending from different edges of the first main body portion.

14. The electrical connector according to claim 12, wherein the first shielding member has a plurality of first extending arms, the first extending arms are formed by extending from different edges of the first main body portion, and the first extending arms are staggered along an extending length of the first main body portion.

15. The electrical connector according to claim 12, wherein the reserved area is a recess, at least one of the second spokes is provided with two adjacent recesses, the two recesses are located at two sides of a corresponding one of the first spokes, the first shielding member has two first extending arms correspondingly located at the two recesses, the two first extending arms located at the two recesses are limited by the corresponding one of the first spokes along an extending length of the second spokes, each of the first spokes is provided with a plurality of through holes arranged along an extending direction thereof, the insulating body is provided with a plurality of protruding portions, and each of the protruding portions is fixed in a corresponding one of the through holes.

16. The electrical connector according to claim 12, wherein the at least one first extending arm is provided to be adjacent to a corresponding one of the first spokes and is limited to a side edge of the corresponding one of the first spokes along an extending length of the second spokes.

17. The electrical connector according to claim 12, wherein:

the first terminal assemblies are arranged in a first row along the second direction, the electrical module further comprises a plurality of second terminal assemblies fixed to the insulating body, the second terminal assemblies are arranged in a second row along the second direction and parallel to the first row, each of the second terminal assemblies comprises a second insulating block, a pair of second signal terminals fixed to the second insulating block, and a second shielding shell covering the second insulating block and the pair of second signal terminals; and the second shielding shell comprises a third shielding member and a fourth shielding member, the third shielding member has a second main body portion and at least one second extending arm extending from the second main body portion, the fourth shielding member has an inner shielding surface and an outer shielding surface provided oppositely along a thickness direction thereof, the inner shielding surface and the second main body portion are altogether surroundingly provided to form a shielding space, the second insulating block and the two second signal terminals are located in the shielding space, the second extending arm is fixed to the outer shielding surface, the insulating body is provided with at least one concave area corresponding to the second extending arm, and the concave area is reserved for the corresponding second extending arm.

18. The electrical connector according to claim 17, wherein:

a plurality of second accommodating slots are concavely provided from the second side toward the first side and are arranged along the second direction, each of the second accommodating slots accommodates a corresponding one of the second terminal assemblies, the concave area is concavely formed on a wall of a corresponding one of the second accommodating slots, one of a plurality of first partition portions is provided between two adjacent ones of the first accommodating slots, and one of a plurality of second partition portions is provided between two adjacent ones of the second accommodating slots; and the first terminal assemblies and the second terminal assemblies deviate from each other along the second direction, and the first partition portions and the second partition portions are completely staggered along the second direction.

19. The electrical connector according to claim 1, wherein each of the first spokes has an extending section, the extending section extends beyond a side edge of a corresponding one of the second spokes to form a free end, the extending section is provided with a through hole, the insulating body is provided with a protruding portion, and the protruding portion is fixed in the through hole.

20. The electrical connector according to claim 1, wherein:

the electrical connector is configured to mate with a mating connector along a mating direction, the mating connector is provided with at least two mating terminals and an insulating covering body covering the two mating terminals, and the insulating covering body is provided with at least one supporting portion configured to support the mating terminals; and a portion of each of the first shielding shells is surroundingly provided around first contact portions of the corresponding pair of first signal terminals and is concavely provided with a reserved slot, a contact surface of each of the first contact portions faces toward the reserved slot, and the reserved slot is configured to reserve for the supporting portion.

21. The electrical connector according to claim 1, wherein the first grounding member is engaged in the insulating body from the first side toward second side, the first grounding member has a first plate surface in contact with a plurality of first shielding side surfaces of the same one of the electrical module and a second plate provided opposite to the first plate surface along a thickness direction thereof, and the second plate surface does not pass beyond the first side along a facing direction thereof.

* * * * *